(12) United States Patent
Akita

(10) Patent No.: US 6,397,135 B1
(45) Date of Patent: May 28, 2002

(54) REAR-WHEEL STEERING ANGLE CONTROL DEVICE

(75) Inventor: Tokihiko Akita, Aichi-ken (JP)

(73) Assignee: Aisin Seiki Kabushiki Kaisha, Aichi-Ken (JP)

(*) Notice: Subject to any disclaimer, the term of this patent is extended or adjusted under 35 U.S.C. 154(b) by 0 days.

(21) Appl. No.: 09/903,575

(22) Filed: Jul. 13, 2001

(30) Foreign Application Priority Data

Jul. 13, 2000 (JP) ........................................ 2000-212992
Dec. 18, 2000 (JP) ........................................ 2000-384150

(51) Int. Cl.[7] ............................. B62D 5/04; B60T 8/32
(52) U.S. Cl. ............................. 701/41; 701/41; 701/42; 701/70; 180/140; 180/141; 180/791; 303/122; 303/146
(58) Field of Search ............................. 701/41, 36, 42, 701/43, 70; 180/791, 141, 79.1, 140, 445, 197; 303/140, 146, 122, 188

(56) References Cited

U.S. PATENT DOCUMENTS 5,457,632 A * 10/1995 Tagawa et al. ............. 180/791
5,816,669 A * 10/1998 Hiwatashi et al. .......... 303/140
5,879,061 A *  3/1999 Koibuchi .................... 303/146
5,957,987 A *  9/1999 Sudo et al. .................... 701/41

OTHER PUBLICATIONS

"7.5.3 4WS control for zero skid", p. 196 of publication No. 1 entitled "Steering and Dynamics" Sep. 10, 1996, Sankaido, Inc., by Kayaba Kougyo, Inc.

"105 a reproduction of control means of swing–out of the 4WS vehicle" publication No. 2 entitled "The proceeding of Japanese Society of Automotive engineering 882, Oct. 1988".

* cited by examiner

Primary Examiner—William A. Cuchlinski, Jr.
Assistant Examiner—Tuan C To
(74) Attorney, Agent, or Firm—Sughrue Mion, PLLC

(57) ABSTRACT

A rear-wheel steering angle control device which improves the running stability of a vehicle by steering the rear wheels as well as the front. Based on the vehicles speed and angle of the turned front wheels, the option angle to turn the rear wheels can be determined. When the rear wheels are turned and continually monitored, the vehicles' turning radius is improved while eliminating the driver's feeling of wrongness which occurs when the rear wheel is over-turned.

9 Claims, 15 Drawing Sheets

(symbols)

| | |
|---|---|
| $\delta r0$ | : regular control target rear-wheel steering angle (°) |
| $\delta rlimit$ | : limited rear-wheel steering angle (°) |
| $\delta r$ | : target rear-wheel steering angle (°) |
| x | : mileage (m) |
| Ts | : control cycle (sec) |
| t0 | : latest pulse input time (sec) |
| t1 | : last pulse input time (sec) |
| $\delta rlimits$ | : continuous limited rear-wheel steering angle (°) |
| $\delta rlimits1$ | : last $\delta rlimits$ (°) |
| $\delta rlimit1$ | : limited rear-wheel steering angle at T1 (°) |
| $\delta rlimitst0$ | : $\delta rlimits$ at t0 (°) |
| $\delta rlimitst1$ | : $\delta rlimits$ at t1 (°) |
| $\delta rs$ | : continuous target rear-wheel steering angle (°) |
| $\delta rs1$ | : last $\delta rs$ (°) |
| $\delta r1$ | : target rear-wheel steering angle at t1 (°) |
| $\delta rst0$ | : $\delta rs$ at t0 (°) |
| $\delta rst1$ | : $\delta rs$ at t1 (°) |
| Xss | : one pulse inteval (m) |
| nss | : the number of counted pulses |
| $\delta f$ | : actual front-wheel steering angle (°) |
| $\delta m$ | : actual rear-wheel steering angle (°) |
| $\delta rb$ | : actual rear-wheel steering angle at leaving time (°) |
| limit map (x) | : map of limited range of target rear-wheel steering angle (°) |
| conv map (x) | : map of convergent ratio of target rear-wheel steering angle |
| ratio map (v) | : map of rear-wheel / front-wheel steering angle ratio |
| Td0 | : pulse time interval at leaving time (sec) |
| Xsoe | : transitional control termination mileage (m) |
| $\gamma$ | : yaw rate (rad/sec) |
| v | : vehicle speed (m/s) |
| L | : wheel base (m) |

Fig. 2

Map of Limited Range of Target Rear-wheel Steering Angle (limit-map)

Map of Conrergent ratio of Target Rear-wheel Steering Angle (conv map)

Map of Rear-wheel / Front-wheel Steering Angle Ratio (ratio map)

(Simulation Condition)
- Steering Wheel Angle : 54.5°
- Front-Wheel Steering Angle : 38.9°
- Vehicle Speed : 5km/h
- Plotting Vehicle Body Outline at Every Second

| Control Means | Turning Width : a(m) | Swing-out Amount of Rear Edge Portion : b(m) |
|---|---|---|
| 2WS | 12.34 | 0.15 |
| Proportional Steering Angle Control | 10.91 | 0.37 |
| Control Shown in Publication No. 2 | 11.09 | 0.03 |
| Control According to This Invention | 11.14 | 0.17 |

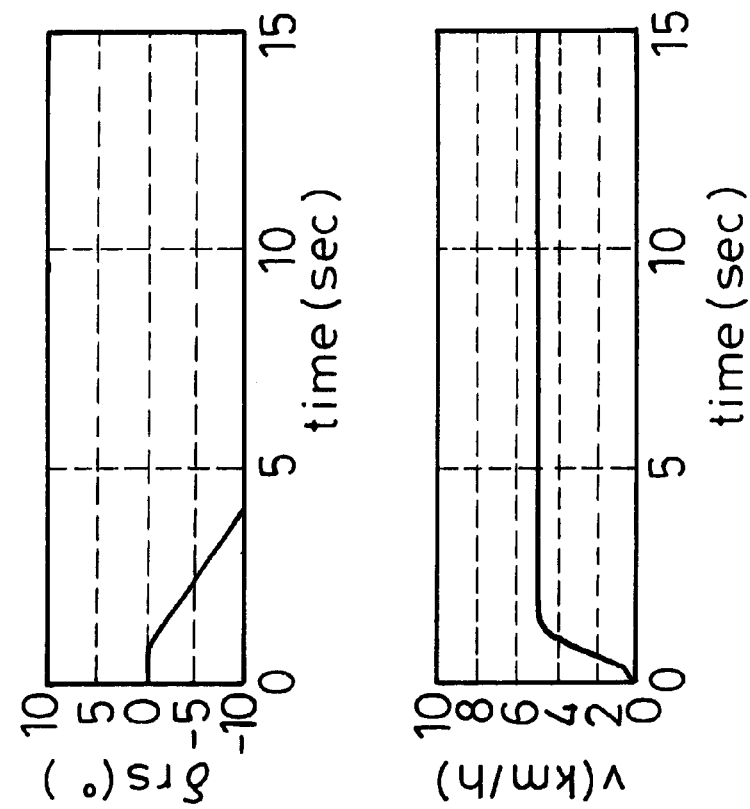
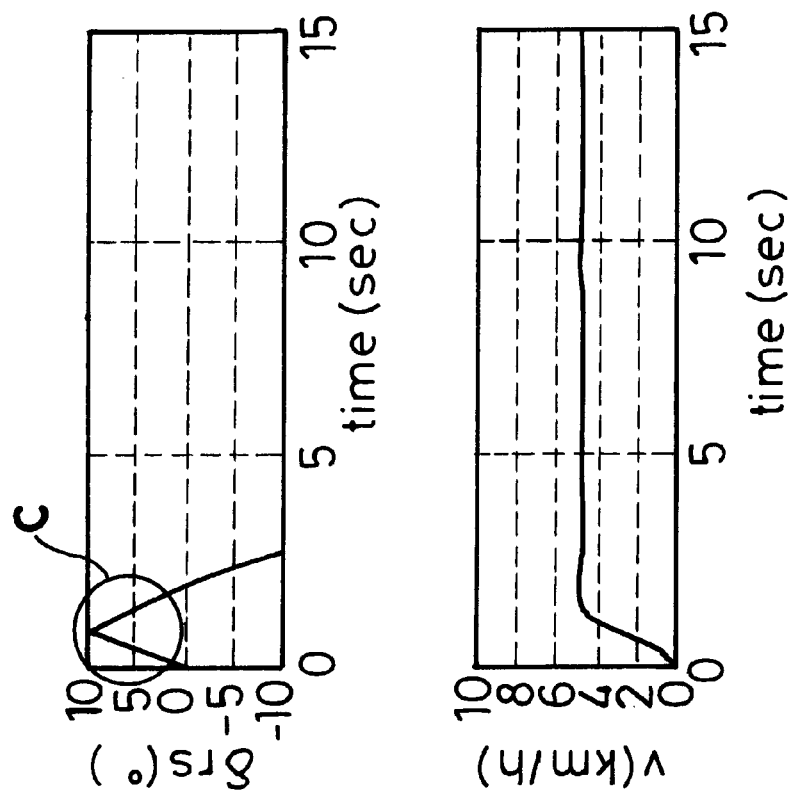
Fig. 17

Fig. 18

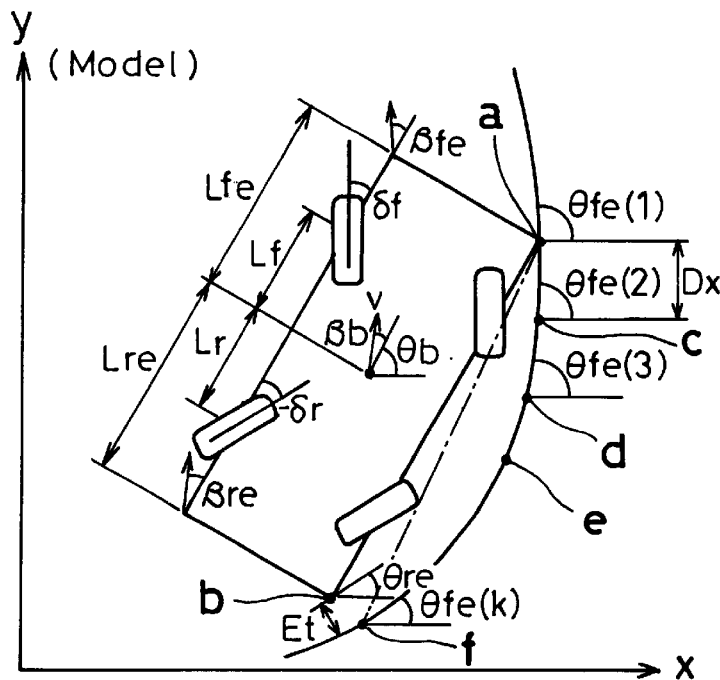

(Model)

(Symbols)

| | |
|---|---|
| $\beta b$ | : Body Slip Angle (rad) |
| $\beta fe$ | : Body Slip Angle at Front Edge Portion (rad) |
| $\beta re$ | : Body Slip Angle at Rear Edge Portion (rad) |
| $\delta f$ | : Front-Wheel Steering Angle (rad) |
| $\delta r$ | : Torget Rear-Wheel Steering Angle (rad) |
| Dx | : Sampling Distance Interval (m) |
| Et | : Deviation between Front End Point Locus and Rear Edge Portion (m) |
| L | : Wheel Base (= Lf+Lr, m) |
| Lf | : Distance between Center of Gravity and Front-wheel Axis (m) |
| Lr | : Distance between Center of Gravity and Rear-wheel Axis (m) |
| Le | : Overall Length (= Lfe + Lre, m) |
| Lfe | : Distance between Center of Gravity and Front Edge Portion (m) |
| Lre | : Distance between Center of Gravity and Rear Edge Portion (m) |
| $\theta b$ | : Vehicle Body Absolute Angle (rad) |
| $\theta fe(n)$ | : Running Direction Angle of Front End Point at n Times Before (rad), n=1~k (k=Le/Dx) |
| $\theta re$ | : Running Direction Angle of Rear End Point (rad) |
| $\gamma$ | : Yaw Rate (rad/sec) |
| v | : Vehicle Speed (m/s) |

REAR-WHEEL STEERING ANGLE CONTROL DEVICE

CROSS REFERENCE TO RELATED APPLICATIONS

This application is based on and claims priority under 35 U.S.C §119 with respect to Japanese Patent Application 2000-384150, filed on Dec. 18, 2000 and Japanese Patent Application 2000-212992, filed on Jul. 13, 2000, the entire contents of which are incorporated herein by reference.

BACKGROUND OF THE INVENTION

1. Field of the Invention:

The present invention relates to a rear-wheel steering angle control device which can improve the running stability of a vehicle with steering rear-wheels as well as front-wheels, in particular, a rear-wheel steering angle control device which can prevent the occurrence of the swing-out at the rear edge portion of the vehicle on condition that the rear-wheel is steered in counter direction to the front-wheel steering angle.

2. Description of the Related Art:

Hitherto, a rear-wheel steering angle control device is known which can improve the running stability of a vehicle and the capability of a small turning circle with steering rear-wheels as well as front-wheels. According to this rear-wheel steering angle control device, it becomes a subject of discussion of how the optimum target rear-wheel steering angle should be relative to the front-wheel steering angle corresponding to every driving condition of the vehicle. For example, in column "7.5.3 4WS control for zero skid" at page 196 of a publication (this publication will be hereafter referred to as "publication No.1") entitled "Steering and Dynamics" (date of publication of the first edition: Sep. 10, 1996, publishing office: SANKAIDO, Inc., author: KAYABA KOUGYO, Inc.), the following is disclosed. The body slip angle (deviation angle between running direction of the vehicle and longitudinal direction of the vehicle) is focused on. When the vehicle speed is lower than a predetermined vehicle speed, the rear-wheel steering angle is controlled in a counter direction to the front-wheel steering angle in proportion to the front-wheel steering angle to obtain the capability of the small turning circle. Also when the vehicle speed is greater than a predetermined vehicle speed, the rear-wheel steering angle is controlled in the same direction as the front-wheel steering angle in proportion to the front-wheel steering angle in order to obtain the ideal vehicle dynamics which has the superior driving stability of the vehicle (this type of the control will be referred to as "proportional steering angle control" hereafter).

However, when the proportional steering angle control as shown in publication No.1 is operated under a low range of the vehicle speed as the vehicle leaves, the rear-wheels are steered in a counter direction to the front-wheel steering angle. Therefore, the capability of the small turning circle is improved. However, there is a problem in that the rear edge portion of the vehicle (in particular, the corner portion of the rear edge of the vehicle) swings out and causes the vehicle to touch an obstacle at the side of the vehicle.

Therefore, in order to solve the problem of this swing-out at the rear edge portion of the vehicle and obtain the capability of the small turning circle as well, a means that controls the rear-wheel steering angle so that the rear edge portion of the vehicle follows the running locus of the front end point of the vehicle is proposed, for example, in column "105 a reduction control means of swing-out of the 4WS vehicle" of publication entitle (this publication will be referred to as "publication No.2 " hereinafter) "The proceedings of Japanese Society of Automotive engineering 882, October, 1988". That is, the running locus of the front end point at every predetermined sampling interval is memorized as sample points, and the rear-wheel steering angle is controlled so that a running direction of the front end point at a nearest sample point which, is the nearest point to the then rear end point among the whole sample points, becomes equal to a running direction of the then rear end point.

However, in the case when this control means, as disclosed in publication No. 2, is employed, it is known that when a steering wheel is being steered just after the vehicle leaves the rear-wheel steering angle is controlled in the same direction to the front-wheel steering angle for a short while and subsequently is controlled in counter direction to the front-wheel steering angle (see the area C of FIG. 17). The occurrence of this matter causes a driver of the vehicle to experience a feeling of wrongness and also increases the energy needed to steer the rear-wheels with uselessly steering the rear-wheels extra.

Also, as for the usual 4WS vehicle, because the controllable range of the rear-wheel steering angle is smaller than the practicable range of the front-wheel steering angle, the rear edge portion of the vehicle can not always be forced to follow the running locus of the front end point of the vehicle. Therefore, when this control means as disclosed in the publication No.2 is applied, there is a problem such that the vehicle runs with the rear-wheels steered in the same direction as the front-wheel steering angle (a state where a deviation between the then rear end point and the nearest sample point remains continuously) under the low range of the vehicle speed, which deteriorates the turning performance of the vehicle (see FIG. 21). Hereinafter, this state will be referred to as "the crab-like running state".

In order to prevent the occurrence of this state as mentioned above, it is necessary to expand the controllable range of the rear-wheel steering angle to the same extent as the practicable range of the front-wheel steering angle. However, expanding the controllable range of the rear-wheel steering angle is difficult in view of the steering mechanism and the space, and causes deterioration of the steering feeling of the driver.

SUMMARY OF THE INVENTION

It is, therefore, an object of the present invention is to present a rear-wheel steering angle control device which can cope with both the improvement of the capability of the small turning circle and the reduction of the swing-out at the rear edge portion of the vehicle under a low range of vehicle speed which are contrary to each other, and does not provide a feeling of wrongness for the driver of the vehicle.

In order to achieve the object, there is provided a rear-wheel steering angle control device comprising a detecting means for detecting at least a vehicle speed, an actual front-wheel steering angle, and an actual rear-wheel steering angle; a target rear-wheel steering angle calculating means for calculating a target rear-wheel steering angle on the basis of the output of the detecting means and the target rear-wheel steering angle calculating means including a mileage detecting means for detecting a mileage reckoned from a leaving time of the vehicle; a rear-wheel steering angle control means for controlling the actual rear-wheel steering angle detected by the detecting means so that the actual rear-wheel steering angle becomes equal or approximately equal to the target rear-wheel steering angle, wherein the target rear-wheel steering angle calculating means calculates the target rear-wheel steering angle by means of a transitional control until the mileage reckoned from the leaving time reaches a predetermined mileage and calculates the target rear-wheel steering angle by means of a regular control after the mileage reckoned from the leaving time reaches the predetermined mileage, wherein the regular control is a control that the target rear-wheel steering angle is calculated in counter direction to the actual front-wheel steering angle at least when the vehicle speed is lower than a predetermined speed, and the transitional control is a control that a temporary target rear-wheel steering angle calculated on the assumption that the regular control is applied is normally employed as the target rear-wheel steering angle, and under a predetermined condition the target rear-wheel steering angle is calculated so that the target rear-wheel steering angle reaches to the temporary target rear-wheel steering angle gradually corresponding to increase of the mileage detected by the mileage detecting means.

According to this invention, the regular control is the control that the target rear-wheel steering angle is calculated in counter direction to the actual front-wheel steering angle at least when the vehicle speed is lower than the predetermined speed. Until the mileage reckoned from the leaving time reaches the predetermined mileage, the transitional control, which is different from the regular control is executed. This transitional control is the control that the temporary target rear-wheel steering angle calculated on the assumption that the regular control applied is the normally employed as the target rear-wheel steering angle, and under the predetermined condition the target rear-wheel steering angle is calculated so that the target rear-wheel steering angle reaches the temporary target rear-wheel steering angle gradually, corresponding to an increase of the mileage detected by the mileage detecting means.

Accordingly, with selecting "the predetermined mileage" and "the predetermined condition" appropriately, even when the temporary target rear-wheel steering angle calculated, on the assumption that the regular control is applied, becomes large in a counter direction to the actual front-wheel steering angle, in the case that the steering wheel is being steered just after the vehicle leaves and the vehicle runs with less than the predetermined speed, the target rear-wheel steering angle reaches the temporary target rear-wheel steering angle gradually, corresponding to an increase of the mileage detected by the mileage detecting means. Therefore, the target rear-wheel steering angle can not reach the large temporary target rear-wheel steering angle without an increase of the mileage. Moreover, at this stage, the target rear-wheel steering angle is always calculated in a counter direction to the actual front-wheel steering angle.

The state cannot occur such that the rear-wheel steering angle is controlled in the same direction as the front-wheel steering angle for a short while even when the control means, as shown in the publication No. 2, is employed. Therefore, when the transitional control is executed once the mileage reckoned from the leaving time reaches the predetermined mileage according to this invention, the rear-wheel steering angle control device can be presented which can provide both the improvement of the capability of the small turning circle and the reduction of the swing-out at the rear edge portion of the vehicle even though they are contrary to each other, but does not provide a feeling of wrongness for the driver of the vehicle.

It is preferable that the target rear-wheel steering angle calculating means further includes a limited range setting means for setting a limited range of the target rear-wheel steering angle which expands gradually corresponding to an increase of the mileage detected by the mileage detecting means under the transitional control, wherein the transitional control is a control that the target rear-wheel steering angle is calculated within the limited range when the temporary target rear-wheel steering angle is out of the limited range. With setting the limited range of the target rear-wheel steering angle to expand gradually corresponding to an increase of the mileage, the target rear-wheel steering angle is controlled within the limited range without an increase of the mileage even when the temporary target rear-wheel steering angle mentioned above becomes large in a counter direction to the actual front-wheel steering angle. Therefore, with selecting n the limited range n appropriately, it becomes easier to well cope with both the improvement of the capability of the small turning circle and the reduction of the swing-out at the rear edge portion of the vehicle which are contrary to each other.

Moreover, in the case of setting the limited range of the target rear-wheel steering angle which expands gradually corresponding to increase of the mileage, it is preferable that the actual rear-wheel steering angle at the leaving time of the vehicle is employed as the target rear-wheel steering angle at the leaving time when the actual rear-wheel steering angle at the leaving time is out of the limited range, and until the target rear-wheel steering angle enters the limited range, the target rear-wheel steering angle calculated at one control cycle before is normally employed as the target rear-wheel steering angle. The temporary target rear-wheel steering angle is employed as the target rear-wheel steering angle only when the absolute value of the temporary target rear-wheel steering angle is smaller than the absolute value of the target rear-wheel steering angle. With this measure, when the actual rear-wheel steering angle at the leaving time is already out of the limited range, until the subsequent target rear-wheel steering angle enters the limited range, a constant value equal to the actual rear-wheel steering angle at the leaving time is normally employed directly as the subsequent target rear-wheel steering angle. The subsequent target rear-wheel steering angle is renewed to the temporary target rear-wheel steering angle whose absolute value is smaller than the absolute value of the target rear-wheel steering angle only when the absolute value of the temporary target rear-wheel steering angle is smaller than the absolute value of the target rear-wheel steering angle. Therefore, until the subsequent target rear-wheel steering angle enters the limited range, the absolute value of the target rear-wheel steering angle can not become larger than the absolute value of the actual rear-wheel steering angle at the leaving time. Herein, because the limited range of the target rear-wheel steering angle expands gradually corresponding to increase of the mileage, the target rear-wheel steering angle enters the limited range in due time with this continuous calculation. After the target rear-wheel steering angle enters the limited range, the temporary target rear-wheel steering angle is normally employed directly as the target rear-wheel steering angle and the target rear-wheel steering angle is calculated within the limited range only when the temporary target rear-wheel steering angle is out of the limited range. Therefore, with this measure, even when the actual rear-wheel steering angle at the leaving time is already out of the limited range, at the stage just after the vehicle leaves, the target rear-wheel steering angle cannot be calculated imprudently large in counter direction to the actual front-wheel steering angle. Accordingly, it becomes easier to wellcope with both the improvement of the capability of the small turning circle and the reduction of the swing-out at the rear edge portion of the vehicle which are contrary to each other.

It is also preferable that the transitional control is a control that the actual rear-wheel steering angle at the leaving time of the vehicle is employed as the target rear-wheel steering angle at the leaving time, and the subsequent target rear-wheel steering angle is calculated so that the subsequent target rear-wheel steering angle reaches gradually the temporary target rear-wheel steering angle calculated on the assumption that the regular control is applied in a predetermined ratio corresponding to increase of the mileage detected by the mileage detecting means. With this measure, even when the temporary target rear-wheel steering angle, calculated on the assumption that the regular control is applied, becomes large in a counter direction to the actual front-wheel steering angle when that the steering wheel is being steered just after the vehicle leaves and the vehicle runs with less than the predetermined speed, the target rear-wheel steering angle reaches to the temporary target rear-wheel steering angle gradually in the predetermined ratio corresponding to increase of the mileage detected by the mileage detecting means. Therefore, the target rear-wheel steering angle cannot reach the large temporary target rear-wheel steering angle without increased mileage. Moreover, at this stage, the target rear-wheel steering angle is always calculated in counter direction to the actual front-wheel steering angle. The state cannot occur in which the rear-wheel steering angle is controlled in the same direction as the front-wheel steering angle for a short while when the control means as shown in the publication No. 2 is employed. Therefore, as compared with the case when the regular control begins to be executed immediately the vehicle leaves, when the transitional control is executed until the mileage reckoned from the leaving time reaches the predetermined mileage according to this invention, the rear-wheel steering angle control device can be presented which can wellcope with both the improvement of the capability of the small turning circle and the reduction of the swing-out at the rear edge portion of the vehicle (which are contrary to each other) and which does not provide a feeling of wrongness for the driver of the vehicle.

By the way, these descriptions mentioned above can be presented on the assumption that the mileage detected by the mileage detecting means is obtained continuously as the vehicle runs. However, in the case that the mileage detected by the mileage detecting means is obtained discretely at every predetermined pulse input time as the vehicle runs, the limited range of the target rear-wheel steering angle and the target rear-wheel steering angle as mentioned above, which are calculated according to the mileage detected by the mileage detecting means, are also calculated discretely. In this case, it is preferable that the discrete values of the limited range of the target rear-wheel steering angle and the target rear-wheel steering angle are revised to be continuous values by bridging them as follows.

Namely, as for the limited range of the target rear-wheel steering angle, it is preferable that the limited range setting means further includes a continuous limited range calculating means for calculating a continuous limited range which is the continuous value bridged at least on the basis of discrete values of the limited range calculated at past pulse input times, wherein the continuous limited range calculating means calculates a current continuous limited range from a latest pulse input time to a next pulse input time at least on the basis of the discrete values of the limited range calculated at past pulse input times and the continuous limited range at a predetermined time before the latest pulse input time, and the continuous limited range calculating means employs the current continuous limited range as the limited range.

Also, as for the target rear-wheel steering angle, it is preferable that the target rear-wheel steering angle calculating means further includes a continuous target rear-wheel steering angle calculating means for calculating a continuous target rear-wheel steering angle which is the continuous value bridged at least on the basis of discrete values of the target rear-wheel steering angle calculated at past pulse input times, wherein the continuous target rear-wheel steering angle calculating means calculates a current continuous target rear-wheel steering angle from a latest pulse input time to a next pulse input time at least on the basis of the discrete values of the target rear-wheel steering angle calculated at past pulse input times and the continuous target rear-wheel steering angle at a predetermined time before the latest pulse input time, and the continuous target rear-wheel steering angle calculating means employs the current continuous target rear-wheel steering angle as the target rear-wheel steering angle.

Accordingly, when the discrete values of the limited range of the target rear-wheel steering angle and the target rear-wheel steering angle are revised to be continuous values, the current continuous value from the latest pulse input time to the next pulse input time is calculated on condition that the revised continuous value at the predetermined time before the latest pulse input time as well as the discrete values calculated at past pulse input times, is taken into consideration. Therefore, the current continuous value obtained by the revised calculation is expected to become a reliable value which takes a past tendency of increase and decrease and a past deviation between the discrete value and the revised continuous value into consideration.

Also, in order to achieve the object of the present invention mentioned above, there is provided a rear-wheel steering angle control device comprising a detecting means for detecting at least a vehicle speed, an actual front-wheel steering angle, and an actual rear-wheel steering angle; a target rear-wheel steering angle calculating means for calculating a target rear-wheel steering angle on the basis of the output of the detecting means; a rear-wheel steering angle control means for controlling the actual rear-wheel steering angle detected by the detecting means so that the actual rear-wheel steering angle becomes equal or approximately equal to the target rear-wheel steering angle, wherein the target rear-wheel steering angle calculating means includes a front end point locus memory means in which a front side point of two points which are both ends of a line segment parallel to a longitudinal direction of the vehicle is employed as a front end point and a rear side point of the two points is employed as a rear end point, and the running locus of the front end point at every predetermined sampling interval is memorized as sample points, and the target rear-wheel steering angle calculating means includes a target rear-wheel steering angle limiting means in which the target rear-wheel steering angle is limited so that the rear end point does not deviate from an inside area of the running locus of the front end point memorized by the front end point locus memory means. Herein, "an inside area of the running locus of the front end point memorized by the front end point locus memory means" refers to a right side area of the running direction of the running locus of the front end point when the vehicle turns to a right side of the running direction and refers to a left side area of the running direction of the running locus of the front end point when the vehicle turns to a left side of the running direction."[A] front end point" and "a rear end point" can be located at any position of the vehicle on the condition that these two points are both ends of a line segment parallel to the longitudinal direction of the vehicle.

According to this invention, the target rear-wheel steering angle calculating means includes the target rear-wheel steering angle limiting means in which the target rear-wheel steering angle is limited so that the rear end point does not deviate from the inside area of the running locus of the front end point memorized by the front end point locus memory means. Therefore, when the rear-wheels are steered in a counter direction to the front-wheel steering angle, the rear end point cannot swing out toward the outside area of the running locus of the front end point which solves the problem of the swing-out of the rear end point of the vehicle.

Also, according to this invention, the target rear-wheel steering angle calculating means can calculate the target rear-wheel steering angle in any way on the condition that the target rear-wheel steering angle calculating means calculates the target rear-wheel steering angle based on the output of the detecting means, which detects at least the vehicle speed, the actual front-wheel steering angle, and the actual rear-wheel steering angle. And the target rear-wheel steering angle limiting means limits the target rear-wheel steering angle so that the rear end point does not deviate from the inside area of the running locus of the front end point memorized by the front end point locus memory means in the case that the rear end point deviates from the inside area with the vehicle running on the basis of the calculated target rear-wheel steering angle. Therefore, this target rear-wheel steering angle calculating means is essentially different from the control means as shown in the publication No. 2 in which the rear-wheel steering angle is controlled so that the rear end point of the vehicle is always forced to follow the running locus of the front end point of the vehicle.

Accordingly, when this invention is applied to the 4WS vehicle in which the controllable range of the rear-wheel steering angle is smaller than the practicable range of the front-wheel steering angle, the crab-like running state cannot occur. Further, the rear-wheel steering angle control device which can well cope with both the improvement of the capability of the small turning circle and the reduction of the swing-out at the rear edge portion of the vehicle (which are contrary to each other) without the deteriorations of the turning performance and other performances of the vehicle.

It is preferable that the target rear-wheel steering angle limiting means calculates a deviation between the then rear end point and a nearest sample point which is the nearest point to the then rear end point among the whole sample points, and calculates a limited target rear-wheel steering angle so that the absolute value of the limited target rear-wheel steering angle is the value made by adding a tolerable amount, calculated corresponding to the deviation to the absolute value of a rear-wheel steering angle calculated so that a running direction of the front end point at the nearest sample point becomes equal to a running direction of the then rear end point. With this measure, it is possible to prevent the swing-out of the rear end point of the vehicle securely and calculate the limited target rear-wheel steering angle more appropriately. In particular, because the absolute value of the limited target rear-wheel steering angle is the value made by adding the tolerable amount, which is calculated corresponding to the deviation, when the deviation occurs, the absolute value of the limited target rear-wheel steering angle is calculated to be larger by the tolerable amount. Therefore, when the rear-wheels are steered in a counter direction to the front-wheel steering angle, it is possible to further improve the capability of the small turning circle.

Moreover, it is preferable that the front end point locus memory means employs a front edge portion of the vehicle as the front end point and employs a rear edge portion of the vehicle as the rear end point. With this measure, the rear edge portion of the vehicle cannot swing out toward the outside area of the running locus of the front edge portion of the vehicle. Therefore, it is possible to prevent the state that the rear edge portion of the vehicle swings out and touches an obstacle at the side of the vehicle.

BRIEF DESCRIPTION OF THE DRAWINGS

Additional objects and advantages of the present invention will become more apparent from the following detailed description of a preferred embodiment thereof when considered with reference to the attached drawings, in which:

FIG. 2 is a drawing which illustrates the correspondence of various physical quantities related to the vehicle to the symbols therefor;

FIG. 17 is a drawing which illustrates a result of a simulation for calculating transitions of a vehicle speed and a target rear-wheel steering angle under the same condition as in FIG. 16 in the case of applying the control means shown in the publication No. 2 and applying the control means according to the first embodiment of the present invention;

FIG. 18 is a drawing which illustrates the correspondence of various physical quantities related to the vehicle to the symbols therefor and which illustrates a model representing the various physical quantities visually;

DETAILED DESCRIPTION OF THE PREFERRED EMBODIMENTS

A rear-wheel steering angle control device in accordance with a preferred embodiment of the present invention will be described with reference to the attached drawings.

Figure 1:
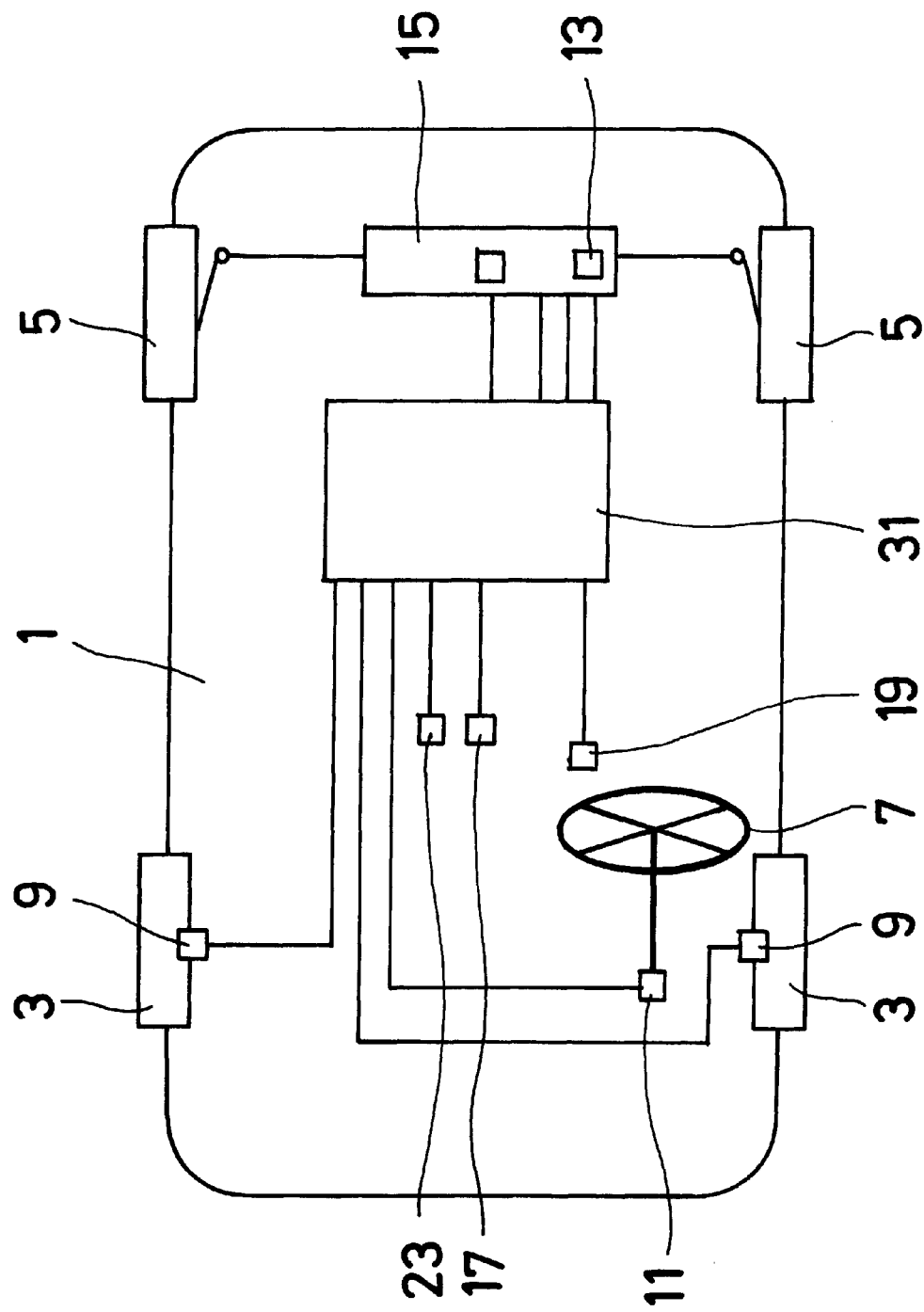
FIG. 1 is a concept drawing which illustrates the 4WS vehicle including a rear-wheel steering angle control device according to the present invention.

First, a basic structure of a whole vehicle and an operation of a rear-wheel steering angle control device will be described simply by means of FIG. 1. FIG. 1 is a concept drawing which illustrates the 4WS vehicle including a rear-wheel steering angle control device according to the present invention. In a vehicle 1, wheel speed sensors 9 (a detecting means) are disposed at front-wheels 3. The wheel speed sensors 9 detect a vehicle speed of the vehicle 1 on the basis of the output thereof. Also, the wheel speed sensors 9 outputs pulses at every designated rotational angle of the front-wheels 3 (at every designated mileage). Therefore, the wheel speed sensors 9 can also work as mileage sensors (a mileage detecting means) by counting the number of the pulses reckoned from a leaving time of vehicle 1. Rear-wheels 5 are connected to an actuator 15 (a rear-wheel steering angle control means) which steers the rear-wheels 5. A rear-wheel steering angle sensor 13 (a detecting means) is disposed at the actuator 15. A front-wheel steering angle sensor 11 (a detecting means) is disposed at a steering wheel 7. The front-wheel steering angle sensor 11 detects an actual steering angle of the front-wheels 3 which are steered corresponding to the rotation of the steering wheel 7. A shift position sensor 23 detects a shift position of a transmission. A yaw rate sensor 17 detects a yaw rate which is generated on the vehicle 1. The outputs of the front-wheel steering angle sensor 11, the rear-wheel steering angle sensor 13, the wheel speed sensors. 9, the shift position sensor 23, and the yaw rate sensor 17 are provided to a controller 21 (a target rear-wheel steering angle calculating means). The controller 21 calculates the optimum target rear-wheel steering angle on the basis of these various sensors, and issues orders to the actuator 15. The actuator 15 steers the rear-wheels 5 so that the actual rear-wheel steering angle becomes equal or approximately equal to the target rear-wheel steering angle.

In this 4WS vehicle including the rear-wheel steering angle control devise according to the present invention mentioned above, it will be described how the rear-wheel steering angle control devise calculates the target rear-wheel steering angle and steers the rear-wheels by means of FIG. 2–FIG. 15. Herein, FIG. 2 represents various physical quantities related to the vehicle necessary to describe how the rear-wheel steering angle control devise calculates the target rear-wheel steering angle by means of symbols therefor, and illustrates the correspondence of the various physical quantities to the symbols therefor. First, the first embodiment of the present invention will be described as follows.

Figure 3:
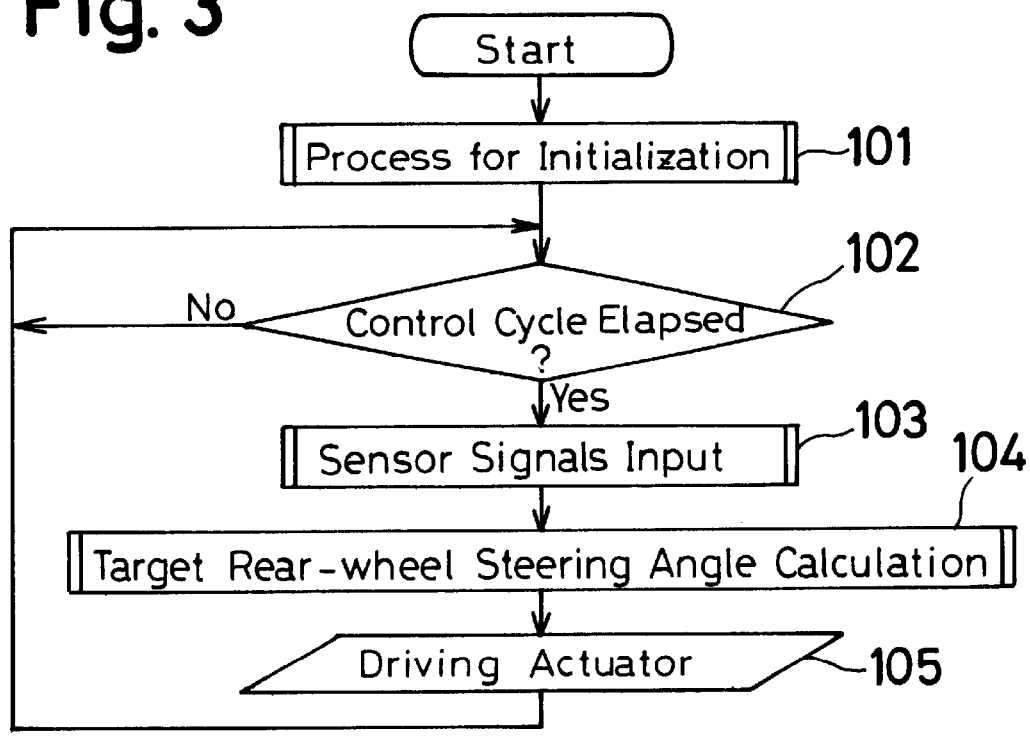
FIG. 3 is a flow diagram which illustrates a main routine which a controller executes.
Figure 4:
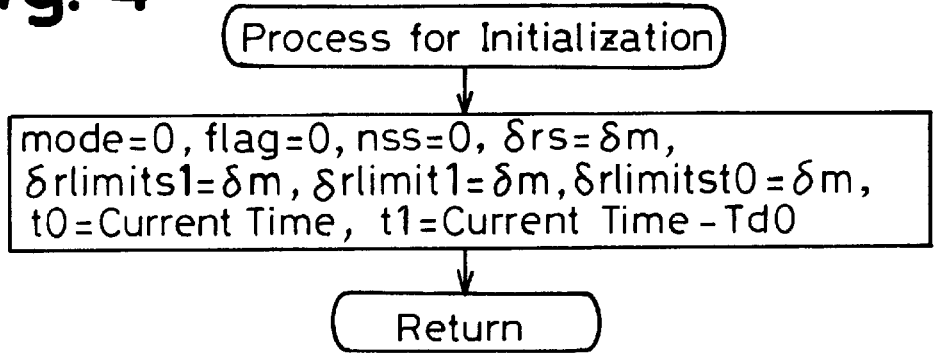
FIG. 4 is a flow diagram which illustrates a process for an initialization according to the first embodiment of the present invention.
Figure 5:
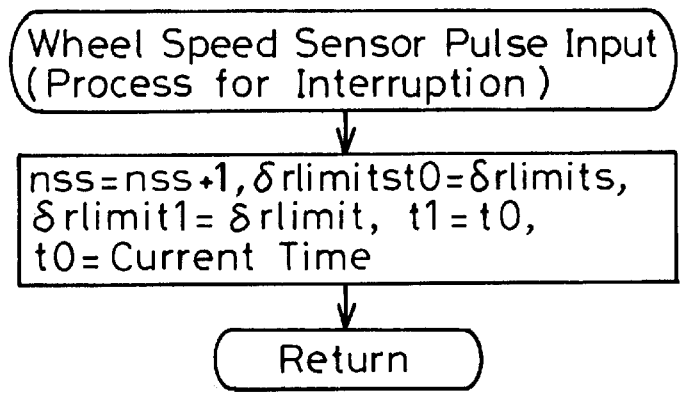
FIG. 5 is a flow diagram which illustrates a process for an interruption according to the first embodiment of the present invention.

FIG. 3 is a flow diagram which illustrates a main routine which the controller 21 executes when the rear-wheel steering angle control devise according to this invention controls the rear-wheel steering angle. In FIG. 3, when an ignition 19 is switched on, this main routine starts and the program advances to step 101 where various variables are initialized. This process for the initialization is embodied as shown in FIG. 4. After this process for the initialization is executed, the program advances to step 102. Processes from step 102 to step 105 are subsequently executed repetitiously. Herein, during his repetitious process, the pulses generated by the wheel speed sensors 9 are inputted with the vehicle 1 running. A wheel speed sensor pulse input process as shown in FIG. 5 is discretely executed at every pulse input time as a process for an interruption.

At step 102, it is decided whether the control cycle Ts (for example, 6 msec) has elapsed. When the control cycle Ts has not elapsed, the program remains at step 102 until the control cycle Ts has elapsed. After the control cycle Ts has elapsed, the program advances to step 103 where the signals of various sensors of the wheel speed sensors 9, the front-wheel steering angle sensor 11, and other sensors are inputted, and the current state of the vehicle 1 is grasped.

At step 104, a target rear-wheel steering angle is calculated on the basis of the information from various sensors inputted at step 103. The details about this target rear-wheel steering angle calculating routine will be described later. After the target rear-wheel steering angle is calculated at step 104, the program advances to step 105 where a serve control is executed, for example, by means of PID control so that the actual rear-wheel steering angle detected by the rear-wheel steering angle sensor 13 becomes equal or approximately equal to the target rear-wheel steering angle calculated at step 104. Thereby, the rear-wheels are steered to an appropriate angle.

Figure 15:
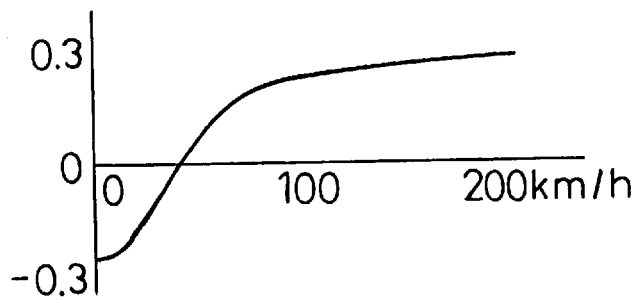
FIG. 15 is a drawing which illustrates a map of a rear-wheel/front-wheel steering angle ratio related to the proportional steering angle control.

As mentioned above, the main routine which the controller 21 executes is described. Next, the target rear-wheel steering angle calculating routine executed at step 104 will be described in detail with reference to FIG. 6. Herein, in this first embodiment, the proportional steering angle control mentioned above is employed as "the regular control". A map of a rear-wheel/front-wheel steering angle ratio related to the proportional steering angle control is shown in FIG. 15. In FIG. 15, when the vehicle speed is lower than a predetermined vehicle speed, the rear-wheel steering angle is controlled in counter direction to the front-wheel steering angle. And when greater than the predetermined vehicle speed, the rear-wheel steering angle is controlled in same direction as the front-wheel steering angle.

Figure 6:
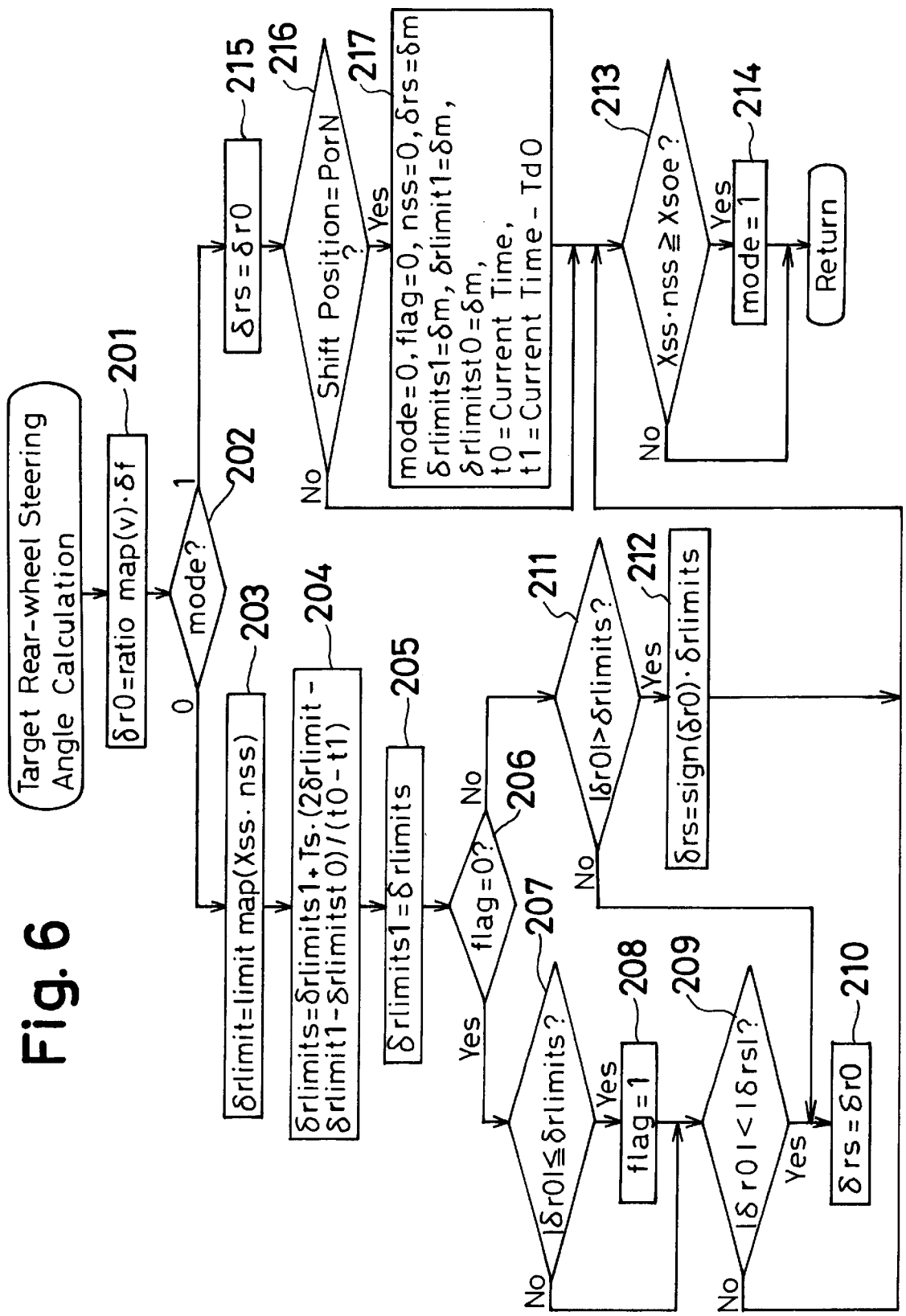
FIG. 6 is a flow diagram which illustrates a routine for calculating a target rear-wheel steering angle according to the first embodiment of the present invention.

In FIG. 6, firstly, at step 201, a regular control target rear-wheel steering an δr0 (a temporary target rear-wheel steering angle) is calculated on the basis of the actual front-wheel steering angle δf detected by the front-wheel steering angle sensor 11 and the vehicle speed v detected by the wheel speed sensors 9.

Next, the program advances to step 202 where it is decided whether the variable "mode" is "0" or "1". "mode=0" corresponds to the stage of the transitional control and "mode=1" corresponds to the stage of the regular control. Herein, at the beginning time of the calculation, through the process for the initialization at step 101, "mode" has become "0" as shown in FIG. 4. Therefore, at the beginning time of the calculation, the stage of the transitional control is inevitably executed.

Figure 13:
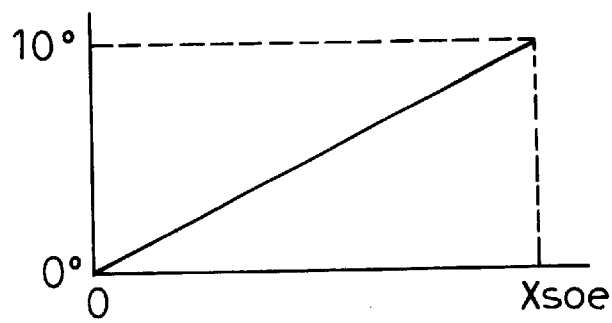
FIG. 13 is a drawing which illustrates a map of a limited range of the target rear-wheel steering angle.

In the following, first, step 203–step 214 corresponding to the transitional control is described. At step 203, a limited rear-wheel steering angle δrlimit (discrete values of the limited range) at the current mileage reckoned from the leaving time of the vehicle 1 is calculated by means of a map of the limited range of the target rear-wheel steering angle (a limited range setting means) as shown in FIG. 13. As shown in FIG. 13, the limited rear-wheel steering angle δrlimit is set to increase from 0° to 10° in proportion to the mileage from zero to a transitional control termination mileage Xsoe (a predetermined mileage). The current mileage reckoned from the leaving time of the vehicle 1 is calculated discretely by multiplying one pulse interval Xss by the number of counted pulses nss. Therefore, the limited rear-wheel steering angle δrlimit calculated as a function of the mileage is calculated discretely as well. Herein, as for the number of counted pulses nss, at the beginning time of the calculation, through the process for the initialization at step 101, "nss" has become "0" as shown in FIG. 4. Subsequently, nss is increased one by one at every pulse input time when the process for the interruption as shown in FIG. 5 is executed.

Figure 11:
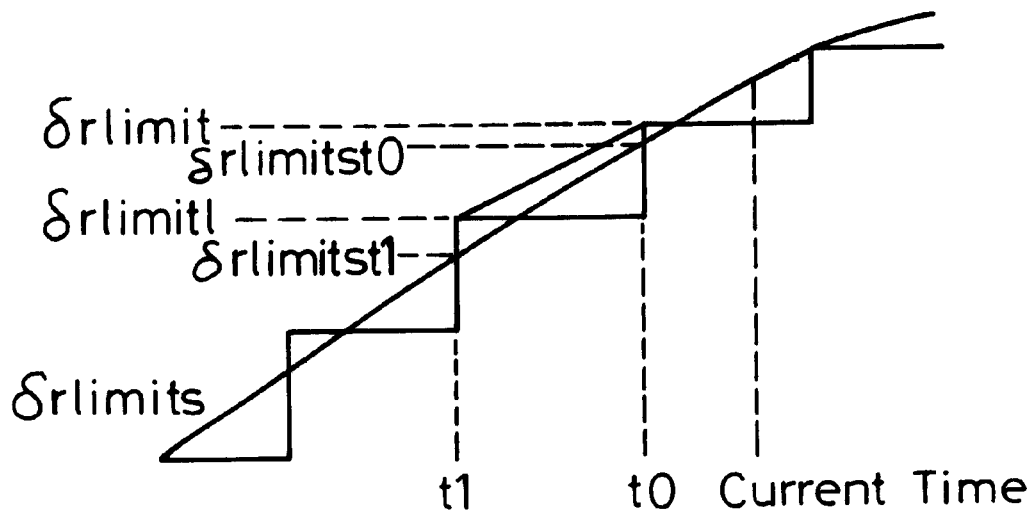
FIG. 11 is a drawing which illustrates a process of a bridging calculation according to the first embodiment of the present invention.

Next, the program advances to step 204 where a continuous limited rear-wheel steering angle δrlimits (a continuous limited range) which is the continuous value is calculated by means of bridging the limited rear-wheel steering angle δrlimit calculated discretely at step 203. FIG. 11 illustrates a process of/this bridging calculation visually. As shown at step 204, the continuous limited rear-wheel steering angle δrlimits is calculated by means of adding an increase amount which is obtained by multiplying a designated gradient by the control cycle Ts to δrlimits1 which is the last δrlimits at one control cycle before. The designated gradient is expressed in a fractional expression where the denominator is (t0–t1), namely, an interval from a latest pulse input time t0 to the last pulse input time t1 and where the numerator is (2δrlimit–δrlimits–δrlimitst0), namely, a value made by adding a value obtained by subtracting δrlimitst0 (continuous value) which is δrlimits at t0 from δrlimit (discrete value) which is the limited rear-wheel steering angle at t0 to a value obtained by subtracting δrlimit1 (discrete value) which is the limited rear-wheel steering angle at t1 from δrlimit (discrete value) which is the limited rear-wheel steering angle at t0. Namely, on the level of FIG. 11, this designated gradient becomes larger than a gradient of a straight line both ends of which are the discrete point (t1, δrlimit1) and the discrete point (t0, δrlimit) by a gradient amount equivalent to a value (a deviation) made by subtracting δrlimitst0 which is the revised continuous value at t0 (a predetermined time) from δrlimit which is the unrevised discrete value at t0. That is, when a current continuous limited rear-wheel steering angle δrlimits (a current continuous limited range) from the latest pulse input time t0 to the next pulse input time (which has not be inputted yet) is calculated, δrlimits is calculated so that a deviation between the discrete value at the latest pulse input time t0 (a predetermined time) and the revised continuous value at t0 is reduced on the basis of the past (before t0) tendency of increase and decrease. Therefore, the possibility that a deviation between a discrete value which will be calculated at the next pulse input time and the current continuous limited rear-wheel steering angle δrlimits which will be calculated at the next pulse input time is reduced effectively can be enhanced. Accordingly, the current continuous limited rear-wheel steering angle (δrlimits calculated at step 204 is expected to become a reliable value. Herein, (δrlimit–δrlimitst0)/(t0–t1) or (δrlimit–δrlimitst1)/(t0–t1) can be applied to the designated gradient mentioned above. As for t0, t1 and the various variables used at step 204, at the beginning time of the calculation, through the process for the initialization at step 101, these values have become the initial values as shown in FIG. 4. Subsequently, these values are renewed at every pulse input time when the process for the interruption as shown in FIG. 5 is executed.

After step 204 is executed, the program advances to step 205 where the current δrlimits is substituted for δrlimits1 which is the last δrlimits as a preparation for executing step 204 at the next control cycle.

At step 206, it is decided whether a variable "flag" is "0" or "1". "Flag=1" corresponds to the state that the absolute value of the regular control target rear-wheel steering an δr0, which is the temporary target rear-wheel steering angle is larger than the (current) continuous limited rear-wheel steering angle δrlimits calculated at step 204, namely, the state that the temporary target rear-wheel steering angle is out of the limited range. "Flag=1" corresponds to the state when the absolute value of δr0 is equal to or smaller than δrlimits, namely, the state when the temporary target rear-wheel steering angle is within the limited range. Herein, at the beginning time of the calculation, through the process for the initialization at step 101, "flag" has become "0" as shown in FIG. 4. Therefore, at the beginning time of the calculation, the process in the case that the temporary target rear-wheel steering angle is out of the limited range is inevitably executed.

In the following, first, step 207–step 210 corresponding to the process in the case when the temporary target rear-wheel steering angle is out of the limited range is described. At step 207, it is decided whether the absolute value of δr0 is equal to or smaller than δrlimits. When the absolute value of δr0 is equal to or smaller than δrlimits, as a preparation for executing the process (step 211, 212) in the case when the temporary target rear-wheel steering angle is within the limited range at the next control cycle, "flag=1" is executed at step 208, and subsequently the program advances to step 209. When the absolute value of δr0 is larger than δrlimits, step 208 is not executed and the program jumps to step 209 with remaining "flag=0".

At step 209, it is decided whether the absolute value of the temporary target rear-wheel steering angle δr0 is smaller than the absolute value of a continuous target rear-wheel steering angleδrs. Herein, the continuous target rear-wheel steering angle δrs corresponds to the target rear-wheel steering angle which is a final target of the calculation in the routine for calculating the target rear-wheel steering angle shown in FIG. 6. At step 209, when the absolute value of δr0 is smaller than the absolute value of δrs, δr0 is substituted for δrs at step 210 and subsequently the program advances to step 213. At step 209, when the absolute value of δr0 is equal to or larger than the absolute value of δrs, step 210 is not executed and the program jumps to step 213 without renewing δrs. Herein, at the beginning time of the calculation, through the process for the initialization at step 101, δrs has become δm which is an actual rear-wheel steering angle at the leaving time of the vehicle 1 as shown in FIG. 4. Therefore, at step 209 and step 210, the actual rear-wheel steering angle at the leaving time is normally employed directly as the continuous target rear-wheel steering angle δrs which is the target rear-wheel steering angle. And only when the absolute value of the temporary target rear-wheel steering angle δr0 is smaller than the absolute value of δrs, the continuous target rear-wheel steering angleδrs is renewed to δr0 the absolute value of which is smaller than the absolute value of δrs. Accordingly, until the target rear-wheel steering angle enters the limited range, the absolute value of the continuous target rear-wheel steering angle δrs which is the target rear-wheel steering angle cannot become larger than the absolute value of δm, which is the actual rear-wheel steering angle at the leaving time of the vehicle 1.

Next, step 211 and step 212 corresponding to the process in the case that the temporary target rear-wheel steering angle is within the limited range are described. At step 211, it is decided whether the absolute value of the temporary target rear-wheel steering angle δr0 is larger than δrlimits calculated at step 204. When the absolute value of δr0 is larger than δrlimits, rlimits with plus sign or minus sign of δr0 is substituted for δrs at step 212, and subsequently the program advances to step 213. When the absolute value of δr0 is equal to or smaller than δrlimits, δr0 is substituted for δrs at step 210, and subsequently the program advances to step 213. Therefore, at step 211 and step 212, the temporary target rear-wheel steering an δr0 is normally employed directly as the (continuous) target rear-wheel steering angle δrs (at step 210). And only when the temporary target rear-wheel steering angle δr0 is out of the limited range, the (continuous) target rear-wheel steering angle δrs is limited to the limited value δrlimits (at step 212

Next, at step 213, it is decided whether the current mileage Xss·nss is equal to or longer than the transitional control termination mileage Xsoe. When the current mileage Xss·nss is equal to or longer than Xsoe, as a preparation for shifting from the stage of the transitional control to the stage of the regular control on and after the next control cycle, "mode=1" is executed at step 214. Subsequently, the program is returned to the main routine shown in FIG. 3 and the processes on and after step 105 are executed. At step 213, when the current mileage Xss·nss is shorter than Xsoe, the transitional control requires to be executed at the next control cycle as well. Therefore, the program jumps to the main routine with remaining "mode=0" and the processes on and after step 105 are executed.

As mention above, the transitional control has been described. Next, step 215–step 217 corresponding to the stage of the regular control are described. Because of the regular control, at step 215, the regular control target rear-wheel steering an δr0 (the temporary target rear-wheel steering angle) is substituted directly for the target rear-wheel steering angle δrs which is the final target of the calculation in the routine for calculating the target rear-wheel steering angle shown in FIG. 6.

At step 216, it is decided whether the shift position detected by the shift position sensor 23 is at "P or N". When the shift position is out of "P or N", it is decided that the vehicle 1 is running. Therefore, the program jumps to the main routine by way of step 213, 214, and these processes of the regular control will be executed at the next control cycle. At step 216, when the shift position is at "P or N", it is decided that the vehicle 1 stops, and subsequently a process for an initialization is executed at step 217. Herein, it is decided that the vehicle 1 "leaves" at this point of time. This process for the initialization is the same as the process for the initialization at step 101. At step 216, when the shift position is at "P or N", "mode=0" and "nss=0"are executed at step 217. Therefore, because Xss·nss is shorter than Xsoe at step 213, step 214 is not executed, and subsequently the program jumps to the main routine with remaining "mode=0". Accordingly, the processes of the stage of the transitional control will be executed at and after the next control cycle. Herein, it is also applicable that the process at step 212 is executed with the process for the initialization at step 217 at the same time, to limit the rear-wheel steering angle within the limited range when the vehicle 1 stops.

As mention above, the first embodiment of the present invention has been described. Herein, this description has been done on the assumption that the wheel speed sensor 9 outputs pulses at every designated rotational angle of the front-wheels 3 (at every designated mileage). However, in some of these types of the wheel speed sensors, the detection of the pulses is difficult under the extremely low speed range. In this case, it is preferable that a means is adopted that calculates the vehicle speed v by utilizing the yaw rate γ detected by the yaw rate sensor 17 until a first pulse is detected after the vehicle 1 leaves. This means is described with a flow diagram shown in FIG. 10 as follows.

Figure 10:
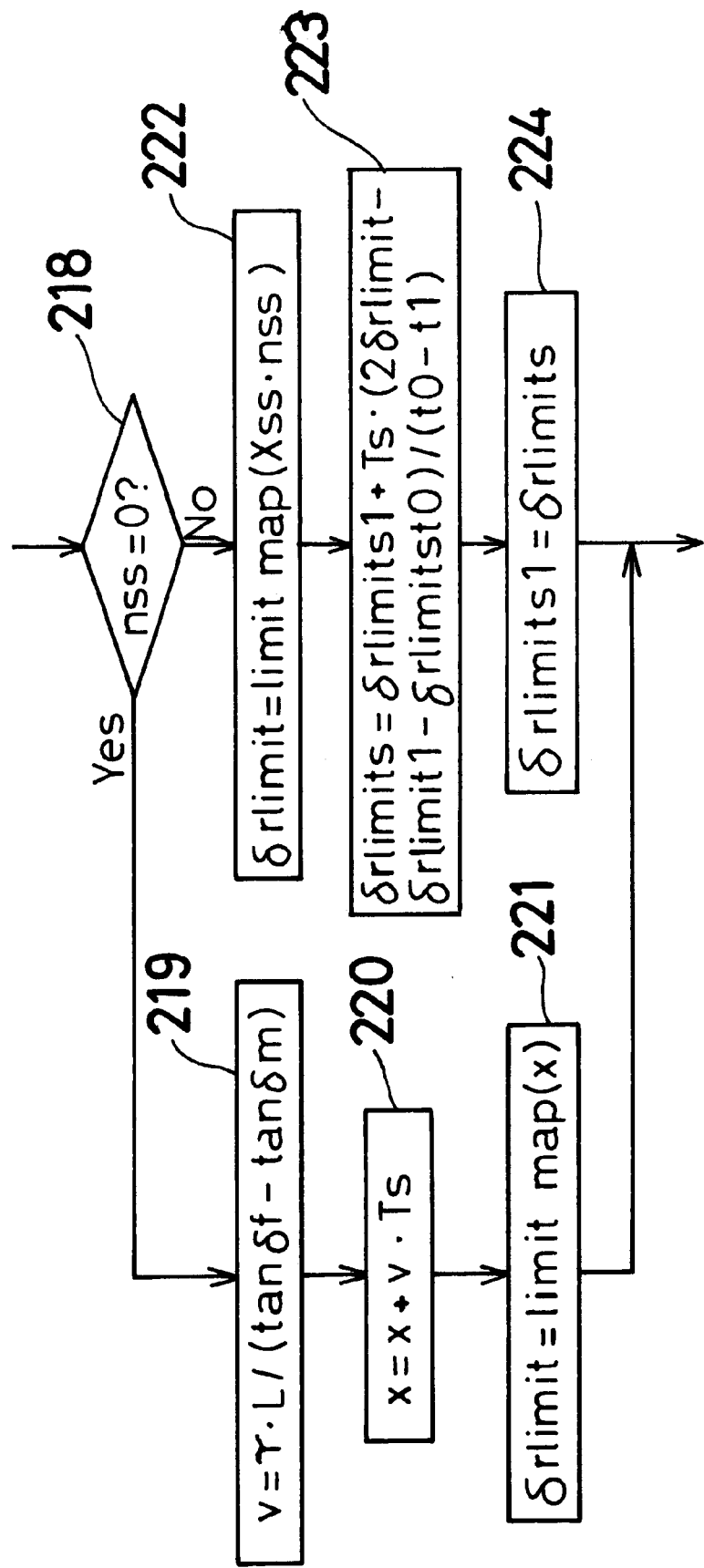
FIG. 10 is a flow diagram which illustrates a substitutive example of a routine for bridging discrete values according to the first embodiment of the present invention.

FIG. 10 illustrates a process which is substituted for step 203–step 205 in FIG. 6. In FIG. 10, step 222–step 224 are the same as step 203–step 205 in FIG. 6. In step 218, when "nss" is not "0", because the first pulse after the vehicle 1 leaves has been detected, the program advances to and after step 222. Subsequently, the processes which are the same as the processes at and after step 203 shown in FIG. 6 are executed. In step 218, when "nss" is "0", because the first pulse after the vehicle 1 leaves has not been detected yet, the program advances to step 219 where the vehicle speed v is detected with the means that calculates the vehicle speed v by utilizing the yaw rate γ as mentioned above. After the vehicle speed is calculated at step 219, the program advances to step 220 and the mileage reckoned from the vehicle leaves is calculated by means of adding a value made by multiplying the control cycle Ts by v (calculated at step 219). At step 221, a limited rear-wheel steering angle δrlimit (continuous value) is calculated by means of substituting x (calculated at step 220) for the map of the limited range of the target rear-wheel steering angle shown in FIG. 13. After step 221 is executed, the program is returned to step 206 shown in FIG. 6, and the processes at and after step 206 are executed.

Next, a rear-wheel steering angle control device according to the second embodiment of the present invention will be described with reference to FIG. 7–FIG. 9. Also, the description in the following about this second embodiment will only refer to distinctions between the first embodiment and the second embodiment.

Figure 7:
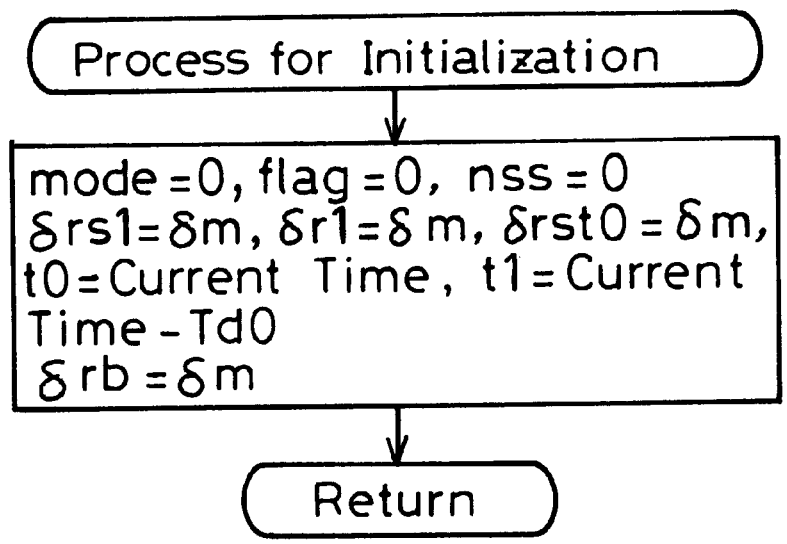
FIG. 7 is a flow diagram which illustrates a process for an initialization according to the second embodiment of the present invention.
Figure 8:
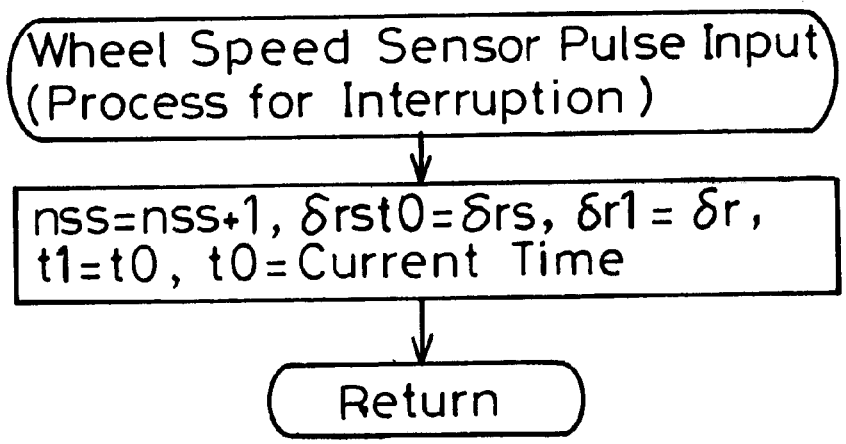
FIG. 8 is a flow diagram which illustrates a process for an interruption according to the second embodiment of the present invention.
Figure 9:
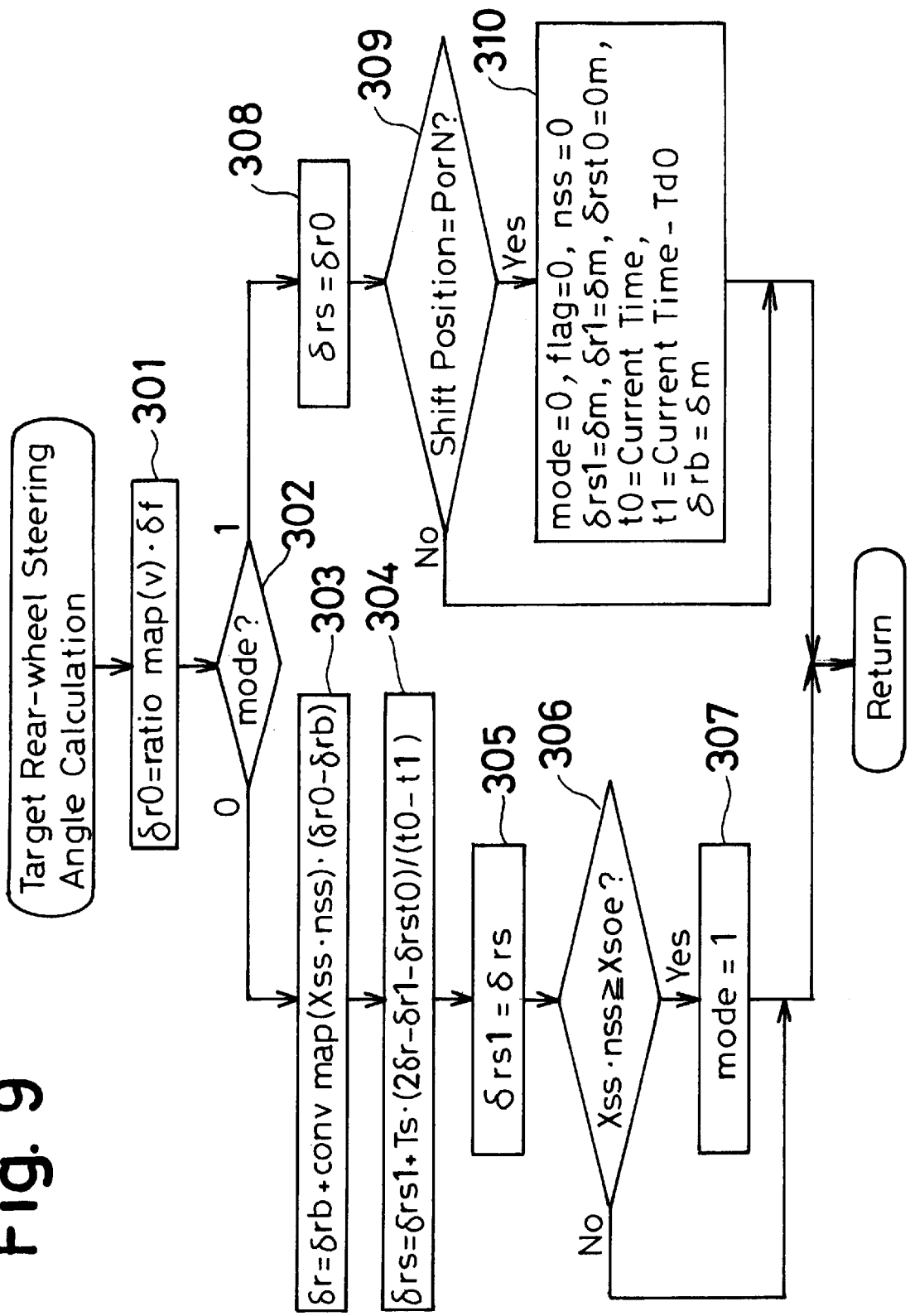
FIG. 9 is a flow diagram which illustrates a routine for calculating a target rear-wheel steering angle according to the second embodiment of the present invention.

The distinctions between the first embodiment and the second embodiment are a process for an initialization shown in FIG. 7 executed at step 101 of the main routine shown in FIG. 3, a process for an interruption executed discretely at every pulse input time from the wheel speed sensor 9, and a part of the stage of the transitional control (step 303–step 305 in FIG. 9). In the following, the processes at step 303–step 305 in FIG. 9 will be described.

Figure 14:
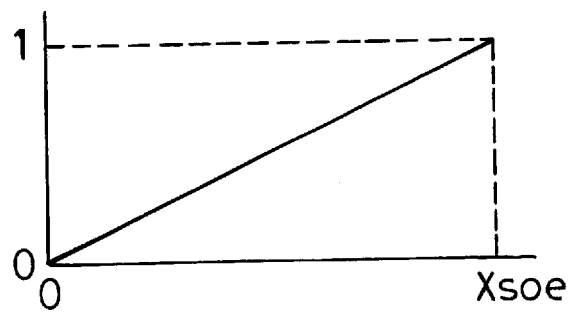
FIG. 14 is a drawing which illustrates a map of a convergent ratio of the target rear-wheel steering angle.

At step 303, a convergent ratio (a predetermined ratio) at a current mileage Xss·nss reckoned from the leaving time of the vehicle 1 is calculated by means of the map of the convergent ratio of the target rear-wheel steering angle shown in FIG. 14. Subsequently, a target rear-wheel steering angle δr which is the discrete value (discrete values of the target rear-wheel steering angle is calculated by means of this convergent ratio so that δr gradually reaches the temporary target rear-wheel steering angle δr0 calculated at step 301 from the actual rear-wheel steering angle δrb at the leaving time of the vehicle 1. As shown in FIG. 14, this convergent ratio is set to increase from 0 to 1 in proportion to the mileage from zero to the transitional control termination mileage Xsoe (a predetermined mileage). Accordingly, δr becomes δrb when the mileage remains zero, and δr becomes δr0 when the mileage reaches Xsoe. The largest point of difference from the first embodiment mentioned above is that the temporary target rear-wheel steering angle δr0 cannot be employed directly as the target rear-wheel steering angle in this second embodiment until the mileage reaches to Xsoe, while it can happen when δr0 is employed directly as the target rear-wheel steering angle at the stage of the transitional control in the first embodiment (see step 210 in FIG. 6).

Figure 12:
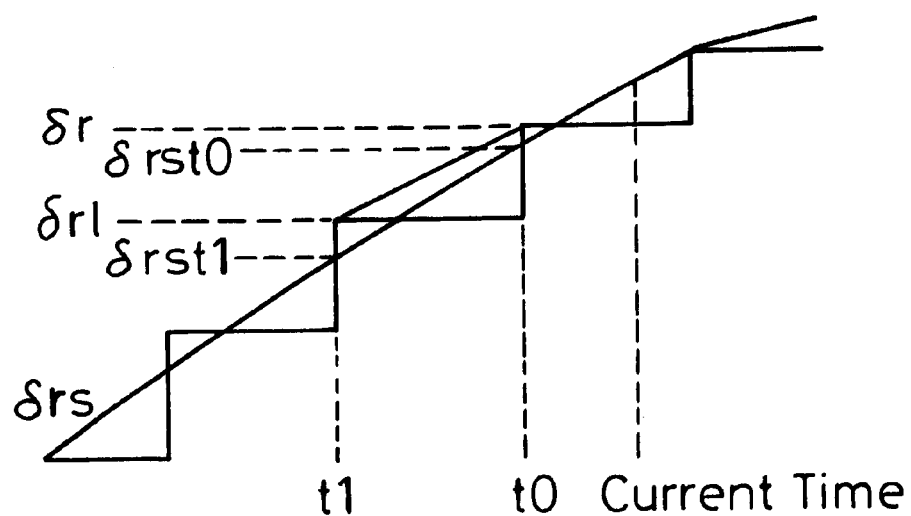
FIG. 12 is a drawing which illustrates a process of a bridging calculation according to the second embodiment of the present invention.

Next, the program advances to step 304, and a (current) continuous target rear-wheel steering angle δrs, which is the continuous value is calculated by means of bridging the target rear-wheel steering angle δr discretely calculated at step 303. FIG. 12 illustrates this process of the bridging calculation visually. Because this process of the bridging calculation at step 304 is entirely the same as one at step 204 shown in FIG. 6 in the first embodiment, the descriptions thereof can be abbreviated.

After step 304 is executed, the program advances to step 305, and the current δrs is substituted for δrs1 which is the last δrs as a preparation for executing step 304 at the next control cycle time. After step 305 is executed, the program advances to step 306. Because the processes at and after step 306 are entirely the same as one at and after step 213 shown in FIG. 6 in the first embodiment, the descriptions thereof can be abbreviated.

As mentioned above, the distinctions between the first embodiment and the second embodiment are described. As described above, related to the rear-wheel steering angle control devise according to the first and second embodiment of the present invention, according to this invention, with selecting "the predetermined mileage Xsoe " and "the predetermined condition (see FIG. 13) (the predetermined ratio (see FIG. 14) )" appropriately, even when the temporary target rear-wheel steering angle δr0 calculated on the assumption that the regular control is applied becomes large in counter direction to the actual front-wheel steering angle in the case that the steering wheel 7 is being steered just after the vehicle 1 leaves and the vehicle 1 runs with less than the predetermined speed, the target rear-wheel steering angle δrs reaches the temporary target rear-wheel steering angle δr0 gradually corresponding to an increase of the mileage detected by the mileage detecting means. Therefore, the target rear-wheel steering angle δrs cannot reach the large temporary target rear-wheel steering angle without an increase of the mileage. Moreover, at this stage, the target rear-wheel steering angle δrs is always calculated in a counter direction to the actual front-wheel steering angle. The state cannot occur such that the rear-wheel steering angle is controlled in the same direction to the front-wheel steering angle for a short while as in the case that the control means as shown in the publication No.2 mentioned above is employed. Therefore, as compared with the case when the regular control begins to be executed immediately the vehicle leaves, when the transitional control is executed until the mileage reckoned from the leaving time reaches the predetermined mileage Xsoe according to this invention, the rear-wheel steering angle control device can be presented which can wellcope with both the improvement of the capability of the small turning circle and the reduction of the swing-out at the rear edge portion of the vehicle (which are contrary to each other) and which does not provide a feeling of wrongness for the driver of the vehicle.

Herein, in these embodiments mentioned above, as for how to calculate the mileage, the case has been described where the mileage is calculated on the basis of multiplying the one pulse interval Xss by the number of counted pulses nss. However, for example, it is applicable that the mileage reckoned from the leaving time of the vehicle 1 is calculated by adding results of calculations which multiplies the vehicle speed calculated at every pulse input time from the wheel speed sensor 9 by one pulse time interval. Also, in these embodiments mentioned above, as for the time of deciding when the vehicle "leaves", the case has been described where the time is when the shift position is shifted into "P or N". However, it is applicable that the time of deciding the vehicle "leaves" is when the shift position is shifted out of "P or N" from "P or N", or, when the vehicle speed becomes faster than zero, moreover, when the vehicle speed becomes faster than zero and the brake pedal is changed into non-depressed condition.

Also, it goes without saying that what we call the ground-speed sensor whose output signal is the continuous value, can be employed as the wheel speed sensor 9. With the groundspeed sensor, it is not necessary to execute the process which bridges the discrete values into the continuous value.

Figure 16:
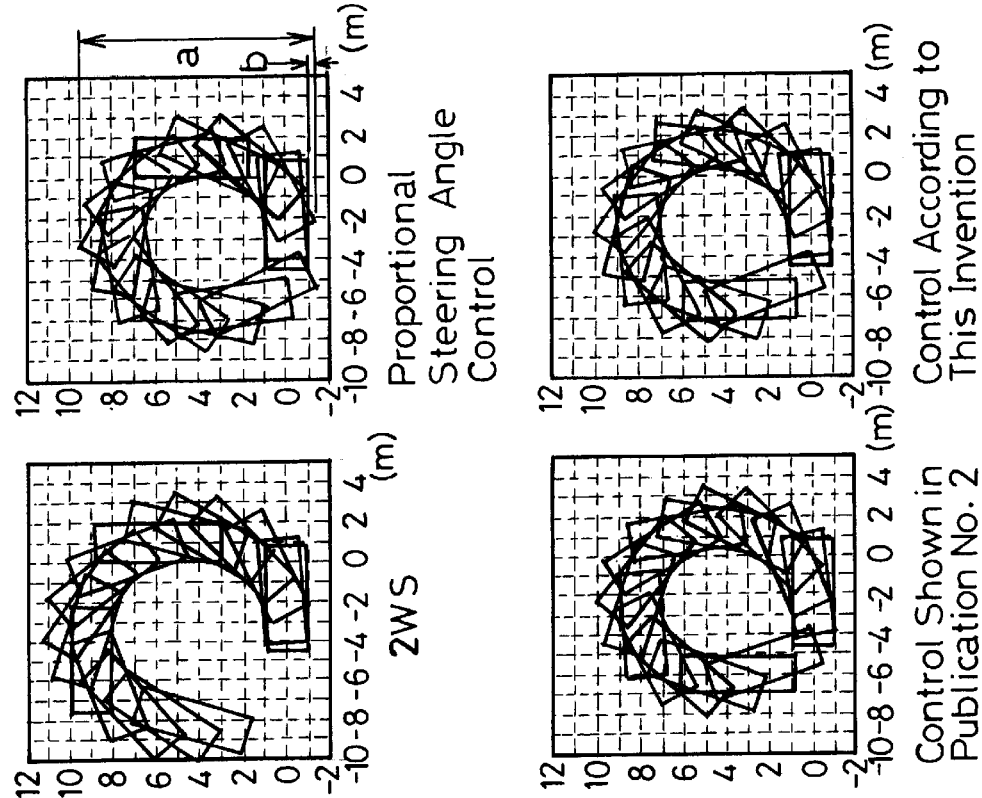
FIG. 16 is a drawing which illustrates a result of a simulation for calculating a running locus of a vehicle which is assumed to turn in the shape of the letter "U" under a predetermined condition in the case of applying every control means.

FIG. 16 and FIG. 17 compares results of simulations for calculating the vehicle dynamics in the case of applying the rear-wheel steering angle control devises in the conventional art and applying the rear-wheel steering angle control devise according to the present invention. FIG. 16 illustrates results of simulations for calculating the running locus of a vehicle which is assumed to turn in the shape of the letter "U" under a predetermined condition in which the steering wheel angle is fixed constantly at 545° to the left side (front-wheel steering angle: 38.93° to the left side) and the vehicle speed is fixed constantly at 5 km/h, in the case of applying 2WS vehicle (whose rear-wheel steering angle keeps zero), the proportional steering angle control, the control means shown in the publication No.2, and the control means according to the first embodiment of the present invention, respectively. The turning width "a" and the swing-out amount of the rear edge portion of the vehicle "b" are shown in FIG. 16. As shown in FIG. 16, as for the turning width "a", it becomes larger in the first embodiment of the present invention than in the proportional steering angle control, but smaller than in 2WS vehicle. Also, as for the swing-out amount of the rear edge portion of the vehicle "b", it becomes larger in the first embodiment of the present invention than in the control means shown in the publication No.2, but smaller than in the proportional steering angle control. These results are entirely consistent with the expected results of the person skilled in this art. Namely, this present invention can present the rear-wheel steering angle control device which can wellcope with both the improvement of the capability of the small turning circle and the reduction of the swing-out at the rear edge portion of the vehicle which are contrary to each other.

FIG. 17 illustrates results of simulations for calculating transitions of the vehicle speed "v" and the target rear-wheel steering angle δrs under the same condition as in FIG. 16, in the case of applying the control means shown in the publication No.2 and applying the control means according to the first embodiment of the present invention. In FIG. 17, the two graphs of the left side show the case of applying the control means shown in the publication No.2, and the two graphs of the right side show the case of applying the control means according to the first embodiment of the present invention. Herein, the plus values of the target rear-wheel steering angle δrs corresponds to the same direction to the front-wheel steering angle (the left side) and the minus values of it corresponds to the counter side to the front-wheel steering angle (the right side). Also, in the case of applying the control means according to the first embodiment of the present invention, it is assumed that the temporary target rear-wheel steering angle δr0 is fixed constantly at −10° over all stages of the transitional control and the regular control, and the actual rear-wheel steering angle δr at the leaving time of the vehicle is zero. As shown in FIG. 17, in the case of applying the control means shown in the publication No. 2, the rear-wheel is steered in the same direction as the front-wheel steering angle during about two minutes from the leaving time of the vehicle (see the area c). As mentioned above, this movement of the rear-wheels causes the driver of the vehicle to experience a feeling of wrongness. However, in the case of applying the control means according to the first embodiment of the present invention, it will be understood that drs gradually reaches the temporary target rear-wheel steering angle δr0−10° (the counter direction to the front-wheel steering angle) from zero during the transitional control (during about four minutes from the leaving time of the vehicle). Accordingly, according to this present invention, it is possible to wellcope with both the improvement of the capability of the small turning circle and the reduction of the swing-out at the rear edge portion of the vehicle which are contrary to each other.

Next, the rear-wheel steering angle control devise according to the third embodiment of the present invention will be described with reference to FIG. 18 and FIG. 19 as follows. FIG. 18 illustrates the correspondence of various physical quantities related to the vehicle to the symbols therefor and which illustrates a model representing the various physical quantities visually.

In FIG. 18, the point "a" corresponds to the front end point, and the point "b" corresponds to the rear end point. Namely, the front end point and the rear end point are set to be located at a front edge portion of the vehicle and a rear edge portion of the vehicle, respectively. Also, θb, θfe(n), and θre are expressed in such a manner that the value zero corresponds to a longitudinal direction of the vehicle 1 when switching on the ignition 19, and these values are the absolute values which are reckoned from the longitudinal direction and which are plus in the counterclockwise direction on the level of FIG. 18. βfe, βb, βre, δf, and δr are expressed in such a manner that the value zero corresponds to a longitudinal direction of the vehicle 1, and these values are the relative values which are reckoned from the longitudinal direction and which are plus in the counterclockwise direction on the level of FIG. 18. Also, the points "a", "c", "d", "e", and "f" are sample points of the running locus of the front end point memorized by the controller 21 (a front end point locus memory means). The point "a" shows a position of a current (latest) front end point. The sample points are discretely memorized at every predetermined sampling distance interval "Dx". At this moment as shown in FIG. 18, a nearest sample point which is the nearest point to the rear end point "b" among the whole sample points is the point "f". The point "f" is the sample point at "k" times before from the current sample point "a". "K" is a natural number obtained by rounding the value Le/Dx off. Also, a deviation between the nearest sample point "f" and the rear end point "b" is expressed in "Et". "Et" is calculated to be plus when the rear end point "b" is located within a left side area of the running direction of the running locus of the front end point "a", and calculated to be minus when the rear end point "b" is located within a right side area of the running direction of the running locus of the front end point "a". Accordingly, at this moment as shown in FIG. 18, "Et" is calculated to be plus.

Figure 19:
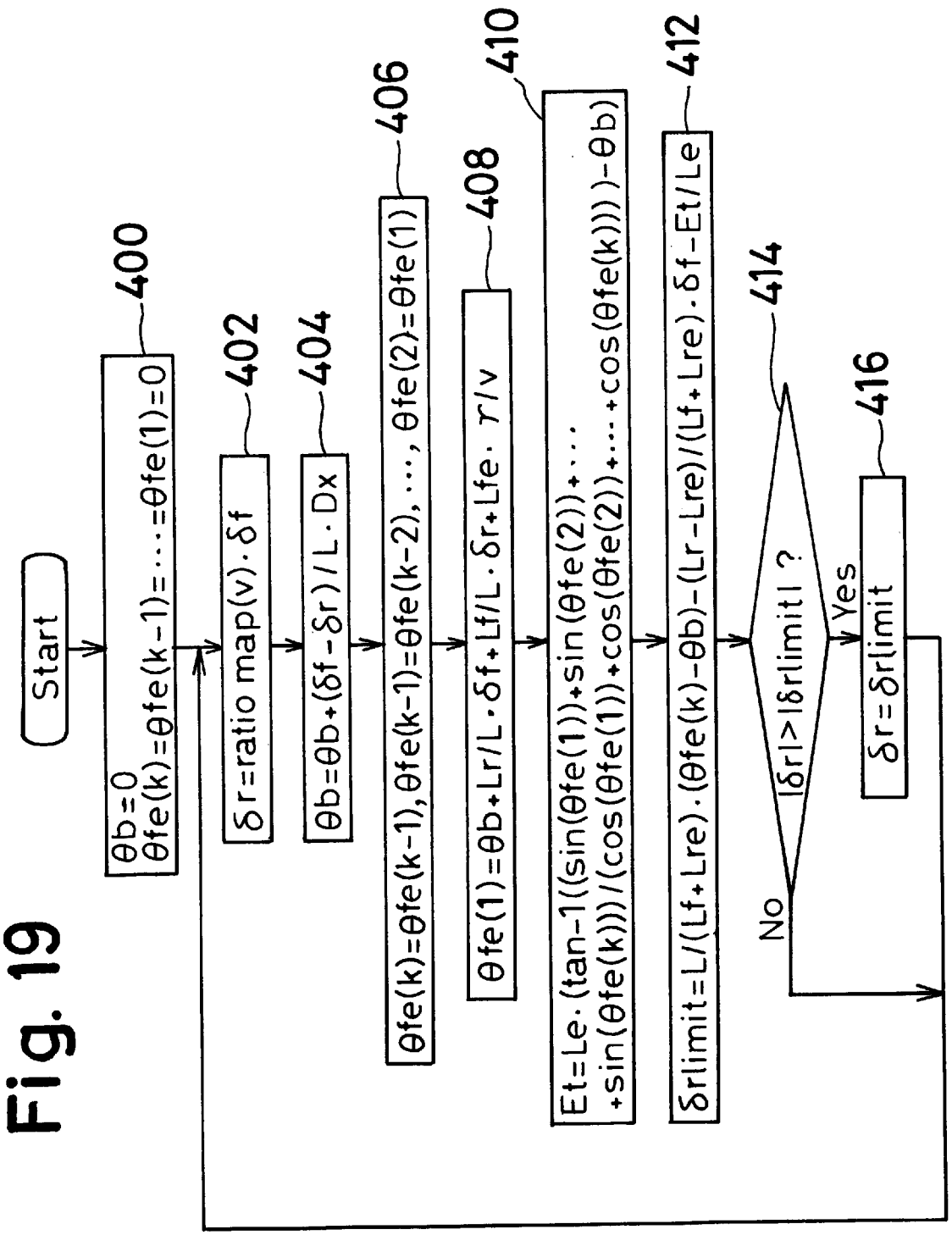
FIG. 19 is a flow diagram which illustrates a calculation algorithm of a controller according to the third embodiment of the present invention.

FIG. 19 is a flow diagram which illustrates a calculation algorithm of the controller 21 when the rear-wheel steering angle control devise, according to this third embodiment of the present invention, calculates the target rear-wheel steering angle. In FIG. 19, after the ignition 19 is switched on, the program advances to step 400, and the controller 21 initializes θb and θfe(n) (n=1–k) to be zero. Subsequently, the program advances to step 402. The processes at and after step 402 are subsequently executed repetitiously. At step 402, the controller 21 calculates a temporary target rear-wheel steering angle δr based on the outputs of the front-wheel steering angle sensor 11, the wheel speed sensor 9, and other sensors. Herein, for example, δr is calculated by means of the proportional steering angle control.

Next, the program advances to step 404 where the controller 21 calculates (renews) a current vehicle body absolute angle θb by means of the formula shown at step 404 based on a current front-wheel angle θf, the temporary target rear-wheel steering angle δr calculated at step 402, a wheel base L, and the predetermined sampling distance interval Dx. At step 406, the controller 21 (a front end point locus memory means) renews running direction angles of the front end point θfe(n=1–k) at every sample point memorized thereby. At step 408, the controller 21 calculates the current running direction angles of the front end point θfe(1) by means of the formula shown at step 408.

Next, at step 410, the controller 21 calculates the deviation Et between the nearest sample point and the rear end point by means of the formula shown at step 410. At step 412, the controller 21 (a target rear-wheel steering angle limiting means) calculates a limited target rear-wheel steering angle δrlimit by means of the formula shown at step 412. In this formula, the term "L/(Lf+Lre)·(θfe(k)−θb)−(Lr−Lre)/(Lf+Lre)·δf" corresponds to the term which calculates a rear-wheel steering angle so that the running direction angle of the nearest sample point θfe(k) becomes equal to the running direction angle of the rear end pointθre. The term "−Et/Le" corresponds to the term which calculates a tolerable amount calculated corresponding to the deviation Et. δrlimit as well as δr, is expressed in such a manner that the value zero of δrlimit corresponds to the longitudinal direction of the vehicle 1, and δrlimit is the relative value which is reckoned from the longitudinal direction and which are plus in the counterclockwise direction on the level of FIG. 18.

Next, at step 414, the controller 21 compares the absolute value of the temporary target rear-wheel steering angle δr calculated at step 402 with the absolute value of the limited target rear-wheel steering angle δrlimit calculated at step 412. As a result of this comparison, when the absolute value of δr is not larger than the absolute value of δrlimit, the temporary target rear-wheel steering angle δr is directly employed as the target rear-wheel steering angle δr. Subsequently, the controller 21 issues orders to the actuator 15 and the actuator 15 steers the rear-wheels 5 so that the actual rear-wheel steering angle becomes equal or approximately equal to the target rear-wheel steering angle δr. On the other hand, as the result of the comparison, when the absolute value of δr is larger than the absolute value of δrlimit, the limited target rear-wheel steering angle δrlimit is employed as the target rear-wheel steering angle δr (step 416). Subsequently, the controller 21 (a target rear-wheel steering angle limiting means) issues orders to the actuator 15 and the actuator 15 steers the rear-wheels 5 so that the actual rear-wheel steering angle becomes equal or approximately equal to the target rear-wheel steering angle δr which is limited. After these processes, the program is returned to step 402, to execute these processes repetitiously.

As mentioned above, when the absolute value of δr is larger than the absolute value of δrlimit, the controller 21 limits the target rear-wheel steering angle δr to the limited target rear-wheel steering angle δrlimit. Therefore, the rear-wheel steering angle control devise according to the third embodiment of this present invention is able to prevent the swing-out at the rear end point completely. In particular, because the absolute value of the limited target rear-wheel steering angle is the value made by adding the tolerable amount which is calculated corresponding to the deviation between the rear end point and the nearest sample point, when the deviation occurs, the absolute value of the limited target rear-wheel steering angle is calculated larger by the tolerable amount. Therefore, when the rear-wheels are steered in a direction counter to the front-wheel steering angle, it is possible to further improve the capability of the small turning circle.

Herein, in this third embodiment as mentioned above, the temporary target rear-wheel steering angle δr is calculated on the basis of the proportional steering angle control. However, it is not necessary to limit the control means of δr to this. It goes without saying that any control means can employed as the control means of the temporary target rear-wheel steering angle δr.

Also, it is applicable that the limited target rear-wheel steering angle δrlimit is always employed as the target rear-wheel steering angle δr. In this case, a difference from the control means shown in the publication No.2 is where the target rear-wheel steering angle δr (=the limited target rear-wheel steering angle δrlimit) is calculated by adding the tolerable amount ("−Et/Le" in the third embodiment) which is calculated corresponding to the deviation ("Et" in the third embodiment) between the rear end point and the nearest sample point. With this measure, when the deviation occurs, the rear-wheels 5 are always steered to aim to make the deviation zero. Therefore, the crab-like running state which becomes the subject of discussion in the case of applying the control means shown in the publication No.2 cannot occur.

Moreover, it goes without saying that it is possible that this present invention is applied as a "front-wheel" steering angle control devise by considering the "front-wheel" and "rear-wheel" as the opposite, respectively.

Figure 20:
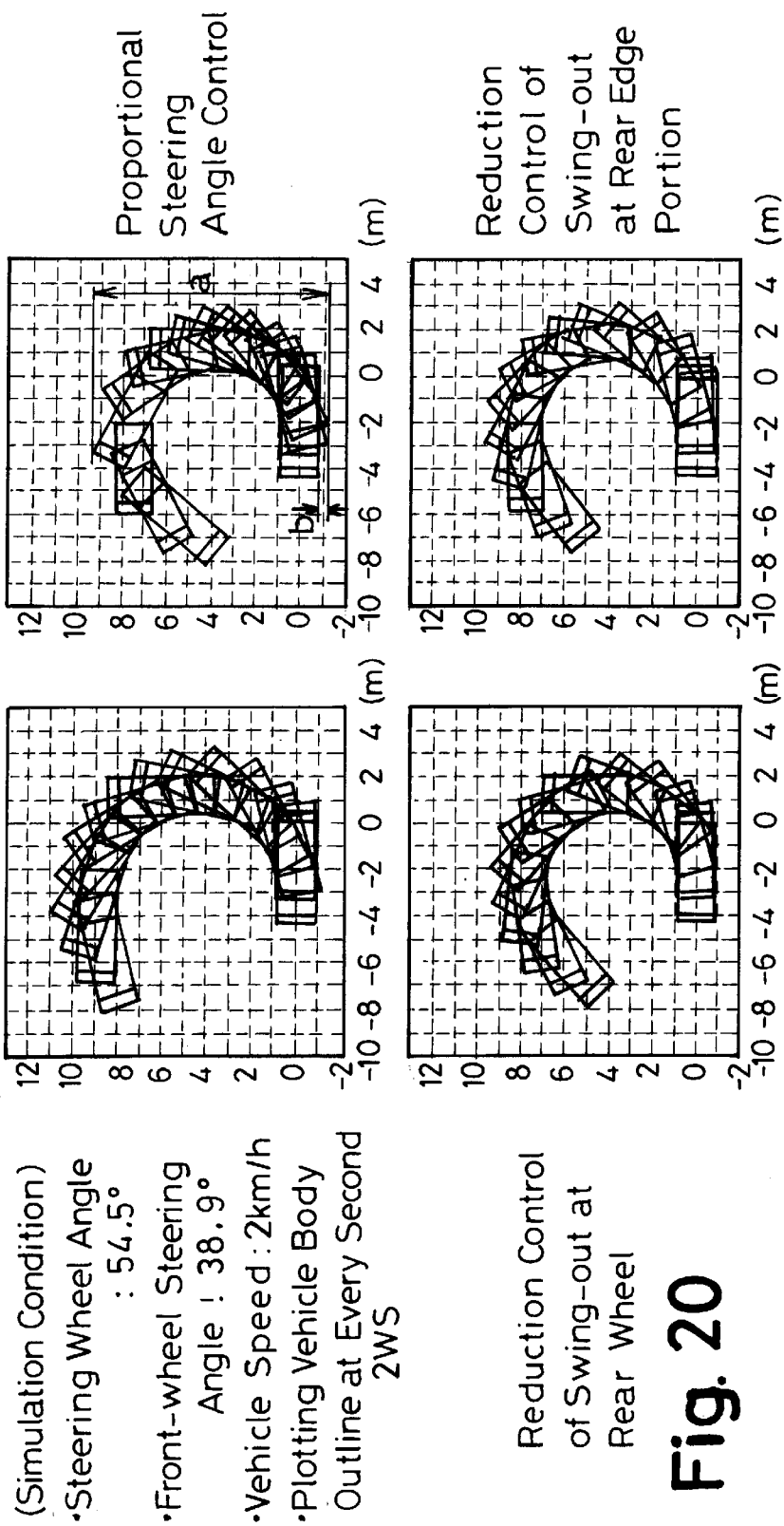
FIG. 20 is a drawing which illustrates a result of a simulation for calculating a running locus of a vehicle which is assumed to turn in the shape of the letter "U" under a predetermined condition in the case of applying every control means.
Figure 21:
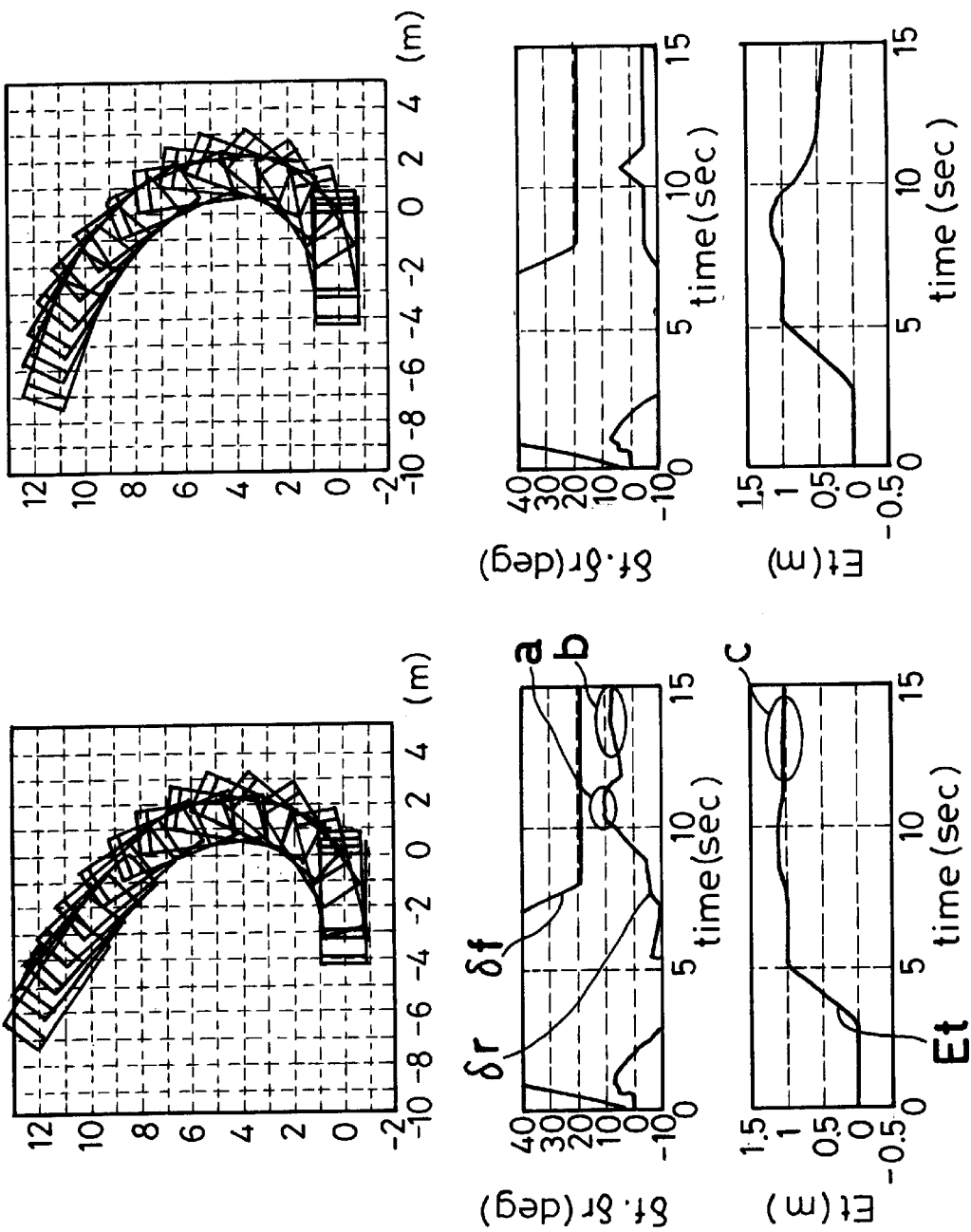
FIG. 21 is a drawing which illustrates a result of a simulation for calculating transitions of a running locus of a vehicle, a front-wheel steering angle, a target rear-wheel steering angle and a deviation between the then rear end point and a nearest sample point under the condition that the front-wheel steering angle is varied in a predetermined pattern in the case of applying the control means shown in the publication No.2 and applying the control means as shown in FIG. 19 according to the third embodiment of the present invention.

FIG. 20 and FIG. 21 compares results of simulations for calculating the vehicle dynamics in the case of applying the rear-wheel steering angle control devises in the conventional art and applying the rear-wheel steering angle control devise according to the present invention. FIG. 20 illustrates results of simulations for calculating the running locus of a vehicle which is assumed to turn in the shape of the letter "U" under a predetermined condition in which the steering wheel angle is fixed constantly at 545° to the left side (front-wheel steering angle: 38.93° to the left side) and the vehicle speed is fixed constantly at 2 km/h, in the case of applying 2WS vehicle (whose rear-wheel steering angle keeps zero), the proportional steering angle control, a reduction control means of swing-out at rear-wheel (the rear end point is located on a rear-wheel axle in the third embodiment of this invention), and a reduction control means of swing-out at rear edge portion (the rear end point is located on a rear edge portion in the third embodiment of this invention), respectively. The turning width "a" and the swing-out amount of the rear edge portion of the vehicle "b" are shown in FIG. 20. As shown in FIG. 20, as for the turning width "a", it becomes larger in the 2WS vehicle than in the other three patterns of the 4WS vehicle. Also, as for the swing-out amount of the rear edge portion of the vehicle "b", it becomes smaller in the 2WS vehicle and in the reduction control means of swing-out at rear edge portion than in the other two patterns of the 4WS vehicle. These results are entirely consistent with the expected results of the person skilled in this art.

FIG. 21 illustrates results of simulations for calculating the running locus of a vehicle, transitions of the front-wheel steering angle δf, the target rear-wheel steering angle δr, and the deviation "Et" between the rear end point and the nearest sample point under a predetermined condition in which the front-wheel angle δf increases from zero to 40° (the left side) for one minute in a linear manner and subsequently keeps constant for six minutes and subsequently decreases from 40° to 20° (the left side) for one minute in a linear manner, in the case of applying the control means shown in the publication No.2 and applying the control means shown in FIG. 19 according to the third embodiment of this present invention, respectively. Herein, the controllable range of the rear-wheel steering angle is set to be 10° and the practicable range of the front-wheel steering angle is set to be 40°. As shown in FIG. 21, when the control means shown in the publication No. 2 is applied, the rear wheel steering angle δr is limited to 10° in the area "a", while it requires more than 10° in the area "a". Therefore, the suitable control of the rear-wheel steering angle can not be executed. As a result, a state that the vehicle runs with keeping the rear-wheels steered in the same direction to the front-wheel steering angle (see the area b) and the deviation "Et" remains continuously (see the area c) occurs also under the low range of the vehicle speed. Namely, the crab-like running state occurs. On the other hand, when the control means shown in FIG. 19 according to the third embodiment of this present invention is applied, the crab-like running state does not occur. Therefore, it is understood that the deviation "Et" is approached toward the convergence.

What is claimed is:

1. A rear-wheel steering angle control device comprising:

a detecting means for detecting at least a vehicle speed, an actual front-wheel steering angle, and an actual rear-wheel steering angle;

a target rear-wheel steering angle calculating means for calculating a target rear-wheel steering angle on the basis of the output of the detecting means and the target rear-wheel steering angle calculating means including a mileage detecting means for detecting a mileage reckoned from a leaving time of the vehicle;

a rear-wheel steering angle control means for controlling the actual rear-wheel steering angle detected by the detecting means so that the actual rear-wheel steering angle becomes equal or approximately equal to the target rear-wheel steering angle, wherein the target rear-wheel steering angle calculating means calculates the target rear-wheel steering angle by means of a transitional control until the mileage reckoned from the leaving time reaches a predetermined mileage and calculates the target rear-wheel steering angle by means of a regular control after the mileage reckoned from the leaving time reaches the predetermined mileage, wherein the regular control is a control that the target rear-wheel steering angle is calculated in counter direction to the actual front-wheel steering angle at least when the vehicle speed is lower than a predetermined speed, and the transitional control is a control that a temporary target rear-wheel steering angle calculated on the assumption that the regular control is applied is normally employed as the target rear-wheel steering angle, and under a predetermined condition the target rear-wheel steering angle is calculated so that the target rear-wheel steering angle reaches to the temporary target rear-wheel steering angle gradually corresponding to increase of the mileage detected by the mileage detecting means.

2. A rear-wheel steering angle control device according to claim 1, wherein the target rear-wheel steering angle calculating means further includes a limited range setting means for setting a limited range of the target rear-wheel steering angle which expands gradually corresponding to increase of the mileage detected by the mileage detecting means under the transitional control, wherein the transitional control is a control that the target rear-wheel steering angle is calculated within the limited range when the temporary target rear-wheel steering angle is out of the limited range.

3. A rear-wheel steering angle control device according to claim 2, wherein the transitional control is a control that the actual rear-wheel steering angle at the leaving time of the vehicle is employed as the target rear-wheel steering angle at the leaving time when the actual rear-wheel steering angle at the leaving time is out of the limited range, and until the target rear-wheel steering angle enters the limited range, the target rear-wheel steering angle calculated at one control cycle before is normally employed as the target rear-wheel steering angle and the temporary target rear-wheel steering angle is employed as the target rear-wheel steering angle only when the absolute value of the temporary target rear-wheel steering angle is smaller than the absolute value of the target rear-wheel steering angle.

4. A rear-wheel steering angle control device comprising:

a detecting means for detecting at least a vehicle speed, an actual front-wheel steering angle, and an actual rear-wheel steering angle;

a target rear-wheel steering angle calculating means for calculating a target rear-wheel steering angle on the basis of the output of the detecting means and the target rear-wheel steering angle calculating means including a mileage detecting means for detecting a mileage reckoned from a leaving time of the vehicle;

a rear-wheel steering angle control means for controlling the actual rear-wheel steering angle detected by the detecting means so that the actual rear-wheel steering angle becomes equal or approximately equal to the target rear-wheel steering angle, wherein the target rear-wheel steering angle calculating means calculates the target rear-wheel steering angle by means of a transitional control until the mileage reckoned from the leaving time reaches a predetermined mileage and calculates the target rear-wheel steering angle by means of a regular control after the mileage reckoned from the leaving time reaches the predetermined mileage, wherein the regular control is a control that the target rear-wheel steering angle is calculated in counter direction to the actual front-wheel steering angle at least when the vehicle speed is lower than a predetermined speed, and the transitional control is a control that the actual rear-wheel steering angle at the leaving time of the vehicle is employed as the target rear-wheel steering angle at the leaving time, and the subsequent target rear-wheel steering angle is calculated so that the subsequent target rear-wheel steering angle reaches gradually to a temporary target rear-wheel steering angle calculated on the assumption that the regular control is applied in a predetermined ratio corresponding to increase of the mileage detected by the mileage detecting means.

5. A rear-wheel steering angle control device according to claim 2, wherein the limited range setting means further includes a continuous limited range calculating means for calculating a continuous limited range which is the continuous value bridged at least on the basis of discrete values of the limited range calculated at past pulse input times on condition that the mileage detected by the mileage detecting means is obtained discretely at every pulse input time, wherein the continuous limited range calculating means calculates a current continuous limited range from a latest pulse input time to a next pulse input time at least on the basis of the discrete values of the limited range calculated at past pulse input times and the continuous limited range at a predetermined time before the latest pulse input time, and the continuous limited range calculating means employs the current continuous limited range as the limited range.

6. A rear-wheel steering angle control device according to claim 4, wherein the target rear-wheel steering angle calculating means further includes a continuous target rear-wheel steering angle calculating means for calculating a continuous target rear-wheel steering angle which is the continuous value bridged at least on the basis of discrete values of the target rear-wheel steering angle calculated at past pulse input times on condition that the mileage detected by the mileage detecting means is obtained discretely at every pulse input time, wherein the continuous target rear-wheel steering angle calculating means calculates a current continuous target rear-wheel steering angle from a latest pulse input time to a next pulse input time at least on the basis of the discrete values of the target rear-wheel steering angle calculated at past pulse input times and the continuous target rear-wheel steering angle at a predetermined time before the latest pulse input time, and the continuous target rear-wheel steering angle calculating means employs the current continuous target rear-wheel steering angle as the target rear-wheel steering angle.

7. A rear-wheel steering angle control device comprising:

a detecting means for detecting at least a vehicle speed, an actual front-wheel steering angle, and an actual rear-wheel steering angle;

a target rear-wheel steering angle calculating means for calculating a target rear-wheel steering angle on the basis of the output of the detecting means;

a rear-wheel steering angle control means for controlling the actual rear-wheel steering angle detected by the detecting means so that the actual rear-wheel steering angle becomes equal or approximately equal to the target rear-wheel steering angle, wherein the target rear-wheel steering angle calculating means includes a front end point locus memory means in which a front side point of two points which are both ends of a line segment parallel to a longitudinal direction of the vehicle is employed as a front end point and a rear side point of the two points is employed as a rear end point, and the running locus of the front end point at every predetermined sampling interval is memorized as sample points, and the target rear-wheel steering angle calculating means includes a target rear-wheel steering angle limiting means in which the target rear-wheel steering angle is limited so that the rear end point does not deviate from an inside area of the running locus of the front end point memorized by the front end point locus memory means.

8. A rear-wheel steering angle control device according to claim 7, wherein the target rear-wheel steering angle limiting means calculates a deviation between the then rear end point and a nearest sample point which is the nearest point to the then rear end point among the whole sample points, and calculates a limited target rear-wheel steering angle so that the absolute value of the limited target rear-wheel steering angle is the value made by adding a tolerable amount calculated corresponding to the deviation to the absolute value of a rear-wheel steering angle calculated so that a running direction of the front end point at the nearest sample point becomes equal to a running direction of the then rear end point.

9. A rear-wheel steering angle control device according to claim 7, wherein the front end point locus memory means employs a front edge portion of the vehicle as the front end point and employs a rear edge portion of the vehicle as the rear end point.

* * * * *